United States Patent
Liehr et al.

(10) Patent No.: US 11,022,585 B2
(45) Date of Patent: Jun. 1, 2021

(54) METHODS AND SYSTEMS FOR OPTIMIZING BUFFER CONDITIONS WITH LIQUID CHROMATOGRAPHY

(71) Applicant: DIONEX CORPORATION, Sunnyvale, CA (US)

(72) Inventors: Shanhua Lin Liehr, Palo Alto, CA (US); Jung Un Baek, San Jose, CA (US); Christopher A. Pohl, Union City, CA (US); Mark Lee Tracy, Sunnyvale, CA (US); Xiadong Liu, Cupertino, CA (US)

(73) Assignee: Dionex Corporation, Sunnyvale, CA (US)

( * ) Notice: Subject to any disclaimer, the term of this patent is extended or adjusted under 35 U.S.C. 154(b) by 161 days.

(21) Appl. No.: 16/435,537

(22) Filed: Jun. 9, 2019

(65) Prior Publication Data

US 2020/0386724 A1 Dec. 10, 2020

(51) Int. Cl.
*G01N 30/34* (2006.01)
*G01N 30/96* (2006.01)
*G01N 30/86* (2006.01)

(52) U.S. Cl.
CPC ......... *G01N 30/34* (2013.01); *G01N 30/8658* (2013.01)

(58) Field of Classification Search
CPC ............... G01N 30/34; G01N 30/8658; G01N 2030/8831; G01N 30/96; B01D 15/166
See application file for complete search history.

(56) References Cited

U.S. PATENT DOCUMENTS

| | | |
|---|---|---|
| 4,801,687 A | 1/1989 | Ngo |
| 5,438,128 A | 8/1995 | Nieuwkerk et al. |
| 5,447,612 A | 9/1995 | Bier et al. |
| 6,544,484 B1 | 4/2003 | Kaufman et al. |
| 6,568,245 B2 | 5/2003 | Kaufman |
| 7,425,263 B2 | 9/2008 | Tsonev I et al. |
| 7,662,930 B2 | 2/2010 | Hua et al. |

(Continued)

FOREIGN PATENT DOCUMENTS

| | | |
|---|---|---|
| EP | 1273592 A2 | 1/2003 |
| EP | 2745902 A1 | 6/2014 |

(Continued)

OTHER PUBLICATIONS

Ahamed et al., "pH-gradient ion-exchange chromatography: an analytical tool for design and optimization of protein separations," J. of Chromatography A, 1164, 2007, 181-188.

(Continued)

*Primary Examiner* — Jennifer Wecker
*Assistant Examiner* — Michael Paul Shimek
(74) *Attorney, Agent, or Firm* — Timothy J. Ohara

(57) ABSTRACT

A plurality of chromatograms is run using a salt gradient with a range of constant pH values or using a pH gradient with a range of constant salt concentrations. A chromatography optimization algorithm can be used to identify at least one salt gradient chromatogram or at least one pH gradient chromatogram to establish optimized buffer conditions. The chromatography optimization algorithm can include a total number of peaks algorithm, a peak-to-valley algorithm, and/or a peak capacity algorithm.

16 Claims, 13 Drawing Sheets

(56) References Cited

U.S. PATENT DOCUMENTS

| | | |
|---|---|---|
| 7,790,025 B2 | 9/2010 | Tsonev I et al. |
| 7,847,936 B2 | 12/2010 | Jarrell |
| 7,911,609 B2 | 3/2011 | Jarrell |
| 8,089,627 B2 | 1/2012 | Jarrell |
| 8,183,046 B2 | 5/2012 | Lu et al. |
| 8,366,899 B2 | 2/2013 | Albrecht et al. |
| 8,921,113 B2 | 12/2014 | Lin et al. |
| 2004/0023405 A1 | 2/2004 | Bevan et al. |
| 2009/0218238 A1 | 9/2009 | Dasgupta et al. |
| 2012/0149875 A1 | 6/2012 | Johansson et al. |
| 2012/0184715 A1 | 7/2012 | Felgenhauer et al. |
| 2012/0239360 A1 | 9/2012 | Bello |
| 2012/0322976 A1 | 12/2012 | Wu et al. |
| 2013/0109102 A1 | 5/2013 | Li et al. |
| 2014/0179008 A1* | 6/2014 | Lin ............... B01D 15/168 436/18 |
| 2018/0079797 A1 | 3/2018 | Nett et al. |

FOREIGN PATENT DOCUMENTS

| | | |
|---|---|---|
| WO | WO-8503578 A1 | 8/1985 |
| WO | 9731692 A1 | 9/1997 |
| WO | WO-2010068272 A1 | 6/2010 |
| WO | WO-2011028753 A1 | 3/2011 |
| WO | WO-2011091982 A1 | 8/2011 |
| WO | WO-2012054104 A1 | 4/2012 |
| WO | WO-2012082933 A1 | 6/2012 |
| WO | WO-2013006138 A1 | 1/2013 |
| WO | WO-2013028922 A1 | 2/2013 |
| WO | WO-2013028924 A1 | 2/2013 |
| WO | WO-2013066707 A1 | 5/2013 |

OTHER PUBLICATIONS

Bates et al., "High-performance chromatofocusing using linear and concave pH gradients formed with simple buffer mixtures: I. Effect of buffer composition on the gradient shape," J. of Chromatography A, 2000, 890, 25-36.

Bates et al., "Quasi-linear pH gradients for chromatofocusing using simple buffer mixtures: local equilibrium theory and experimental verification," J. of Chromatography A, 1998, 814, 43-54.

ChromSword: "Intelligent Software Tools for Automatic HPLC Method Development Robustness Testing," Feb. 2010, 12 pages.

Farnan et al., "Multiproduct high-resolution monoclonal antibody charge variant separations by pH gradient ion-exchange chromatography," Anal. Chem., 2009, 81, 8846-8857.

Horvath et al., "Peak Capacity in Chromatography," Analytical Chemistry, Dec. 1, 1967, vol. 39, Issue No. 14, p. 1893.

Joseph S et al., "Maximizing Chromatographic Peak Capacity with the Agilent 1290 Infinity LC System Using Gradient Parameters," Publication No. 2990-6933EN, Dec. 1, 2010, 8 pages.

Kang et al., "High-performance chromatofocusing using linear and concave pH gradients formed with simple buffer mixtures: II. Separation of proteins," J. of Chromatography A, 2000, 890, 37-43.

Karashima, Masatoshi: "ChromSword reduces HPLC method development time for new drugs," Analytical Development Laboratories, Takeda Pharmaceutical Company, Ltd., Osaka, Japan, Publication No. 5990-5183EN, Jan. 1, 2010, 2 pages.

Kroener et al., "Systematic generation of buffer systems for pH gradient ion exchange chromatography and their application," J. of Chromatography A, 2013, doi:10.1016/j.chroma.2013.02.017.

Lin et al., "A Novel pH Gradient Separation Platform for Monoclonal Antibody (MAb) Charge-Variant Analysis," www.thermoscientific.com/dionex, 7 pgs., 2013.

Neue, Uwe D., "Theory of Peak Capacity in Gradient Elution," Journal of Chromatography A, Issue 1079, 2005, pp. 153-161.

Neue Uwe Dieter: "Peak Capacity in Unidimensional Chromatography," Journal of Chromatography A, Issue 1184, 2008, pp. 107-130.

PlSep: anion, cation and combined ion exchange chromatography for separation of proteins and charged molecules by external pH gradients, CryoBioPhysica, 4 pages.

Rea et al., "Monoclonal Antibody Development and Physicochemical Characterization by High Performance Ion Exchange Chromatography," Innovations in Biotech, Dr. Eddy C. Agbo (Ed.), 439-464, 2012.

Rea et al., "Validation of a pH gradient based ion-exchange chromatography method for high-resolution monoclonal antibody charge variant separations," J Pharm Biomed Anal., 54(2), pp. 317-323, 2011 (Epub Sep. 29, 2010).

Schneider et al., "Optimizing Protein Separations with Cation Exchange Chromatography Using Agilent Buffer Advisor," Nov. 2, 2017, 8 pages.

Tsonev et al., "Improved resolution in the separation of monoclonal antibody isoforms using controlled pH gradients in IEX chromatography," Amer. Biotech. Lab., Jan. 2009, 3 pages.

Wang et al., "Peak Capacity Optimization of Peptide Separations in Reversed-Phase Gradient Elution Chromatography," Analytical Chemistry, May 15, 2006, vol. 78, Issue No. 10, pp. 3406-3416.

Zhang et al., "Improving pH gradient cation-exchange chromatography of monoclonal antibodies by controlling ionic strength," J Chromatogr A, 1272, 56-64, 2013 (Epub Nov. 29, 2012).

Farsang et al., "Tuning selectivity in cation-exchange chromatography applied for monoclonal antibody separations, part 1: Alternative mobile phases and fine tuning of the separation", Jjournal of Pharmaceutical and Biomedical Analysis, vol. 168, Feb. 19, 2019 (Feb. 19, 2019), pp. 138-147.

Klein E J et al., "NNeural Network Signal Interpretation for Optimization of Chromatographic Protein Purifications", Applied Mathematics and Computer Science, Higher College of Engineering, vol. 8, No. 4, Jan. 1, 1998 (Jan. 1, 1998), pp. 865-886.

Liangyi Zhang et al., "Improvinb pH gradient cation-exchange chromatography of monoclonal antibodies by controlling ionic strength", Journal of Chromatography A, vol. 1272, Jan. 2013, pp. 56-64.

* cited by examiner

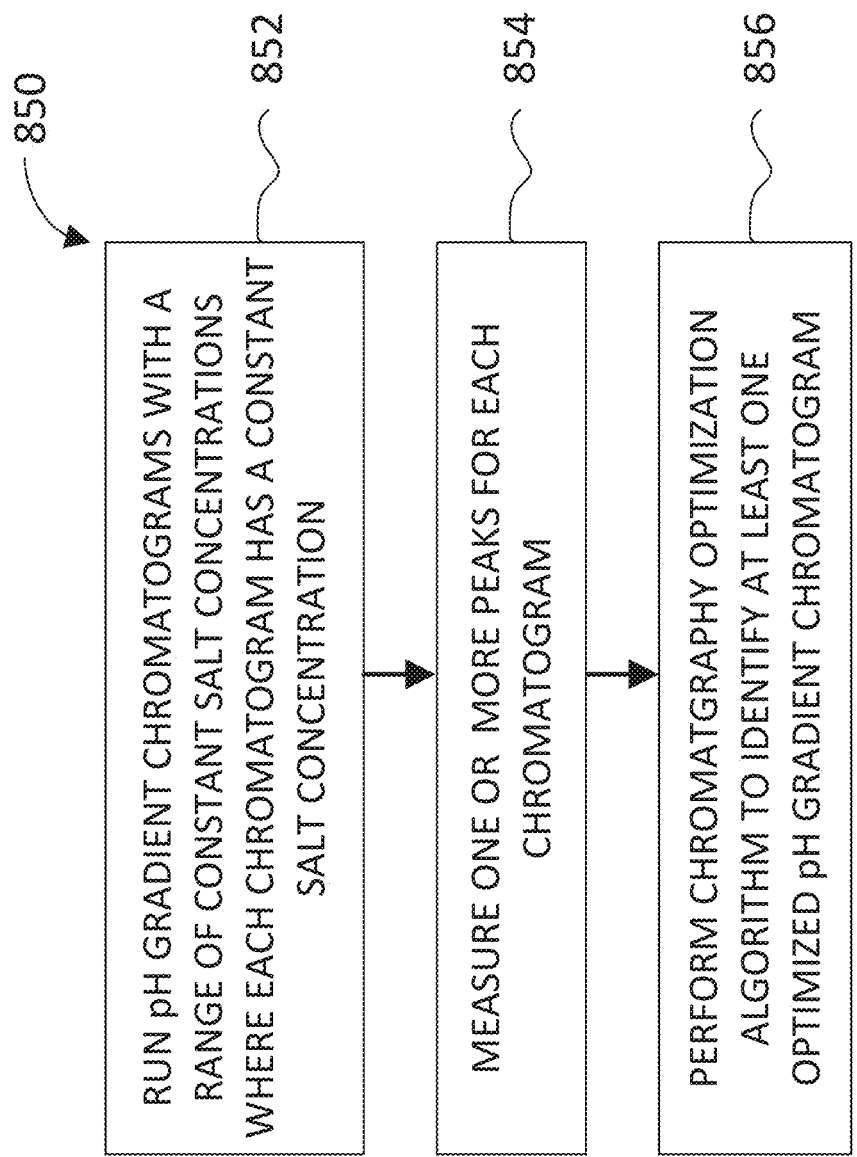

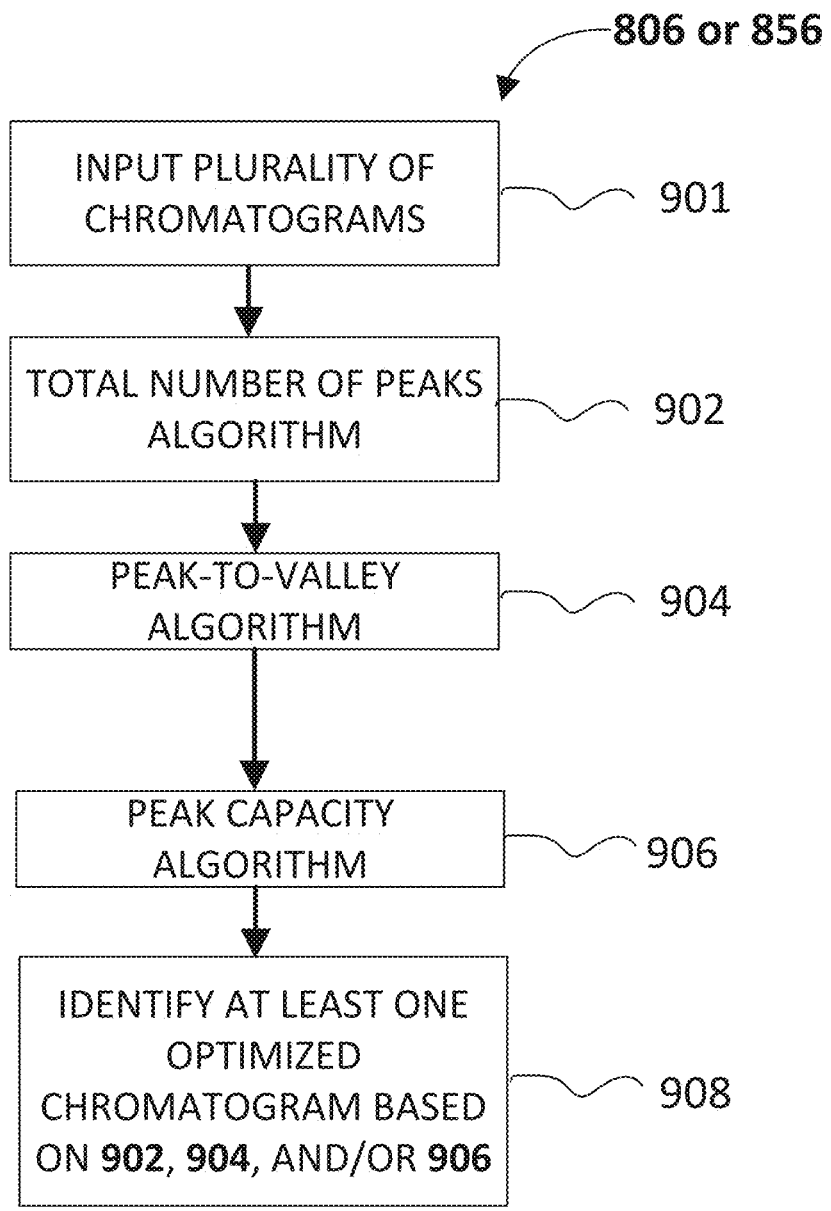

METHODS AND SYSTEMS FOR OPTIMIZING BUFFER CONDITIONS WITH LIQUID CHROMATOGRAPHY

FIELD OF THE INVENTION

The invention generally relates to methods and systems for optimizing buffer conditions with liquid chromatography.

BACKGROUND

Chromatography is a widely used analytical technique for the chemical analysis and separation of molecules. Chromatography involves the separation of one or more analyte species from other matrix components present in a sample. A stationary phase of a chromatography column is typically selected so that there is an interaction with the analyte. Such interactions can be ionic, hydrophilic, hydrophobic, or a combination thereof. For example, the stationary phase can be derivatized with ionic moieties that ideally will bind to ionic analytes and matrix components with varying levels of affinity. A mobile phase is percolated through the stationary phase and competes with the analyte and matrix components for binding to the ionic moieties. The mobile phase or eluent are terms used to describe a liquid solvent or buffer solution that is pumped through a chromatography column to elute the analyte and matrix components off of the stationary phase as a function of time and then be detected at a detector. Examples of some typical detectors are a conductivity detector, a UV-VIS spectrophotometer, and a mass spectrometer. Over the years, chromatography has developed into a powerful analytical tool that is useful for creating a healthier, cleaner, and safer environment where complex sample mixtures can be separated and analyzed for various industries such as water quality, environmental monitoring, food analysis, pharmaceutical, and biotechnology.

Chromatography such as ion exchange chromatography (IEC), hydrophobic interaction chromatography (HIC), and reverse phase chromatography are used widely in protein characterization and purification. A monoclonal antibody (mAb) is a particular type of protein that has been used in the biopharmaceutical market. Chromatography with tailored buffer conditions can be used to characterize samples containing monoclonal antibodies for quality and research purposes. A pH gradient or salt gradient can be used to improve the chromatographic separation of sample containing a variety of different proteins that include charge variants, oxidation variants, and/or various impurities. Under certain circumstances, the pH level of the salt gradient mobile phase or the electrolyte concentration of the pH gradient mobile phase needs to be optimized for a particular protein component, which can be a time-consuming step and result in a bottleneck for method development. Applicant believes that there is a need for improved methods and systems for determining buffer conditions for salt gradients and/or pH gradients for chromatographically separating biomolecules.

SUMMARY

In a first embodiment, a method of determining buffer conditions for analyzing a biomolecule with a chromatography column is described using a salt gradient. The method includes performing a first, a second, and a third salt gradient chromatography runs using mobile phases having a first, a second, and a third constant pH values, respectively, to analyze the biomolecule. The mobile phases have the first, the second, and the third constant pH values and were prepared with a first, a second, and a third predetermined proportions of a first eluent solution and a second eluent solution, respectively. The first, the second, and the third predetermined proportions are different. The first, the second, and the third salt gradient chromatography runs each used a same salt gradient concentration range, a same gradient time, and a same salt gradient concentration change rate. The first eluent solution includes at least four buffer salts where at least three of the four buffer salts are a monovalent buffer salt, have a net negative charge or a net neutral zwitterionic charge over a pH range of about 6 to about 10, and include a sulfonate group and an amine, where the first eluent solution has a first pH of about 6. The second eluent solution includes at least four buffer salts where at least three of the four buffer salts are a monovalent buffer salt, have a net negative charge or a net neutral zwitterionic charge over a pH range of about 6 to about 10, and include a sulfonate group and an amine, where the second eluent solution has a second pH of about 10. One or more peaks are measured during each of the first, the second, and the third salt gradient chromatography runs. A chromatography optimization algorithm is performed on the measured one or more peaks of the first, the second, and the third salt gradient chromatography runs to identify at least one optimized salt gradient chromatography run from the first, the second, and the third salt gradient chromatography runs. The performing of the chromatography optimization algorithm identifies at least one optimized salt gradient chromatography run from the first, the second, and the third salt gradient chromatography runs.

In regards to the first embodiment, the chromatography optimization algorithm includes a total number of peaks algorithm, a peak-to-valley algorithm, and a peak capacity algorithm. The total number of peaks algorithm includes counting a total number of the peaks measured for each of the first, the second, and the third salt gradient chromatography runs; and identifying at least one of the first, the second, and the third salt gradient chromatography runs as having a largest total number of peaks. The peak-to-valley algorithm that includes calculating a preceding peak-to-valley ratio for each of the first, the second, and the third salt gradient chromatography runs. The calculating of the preceding peak-to-valley ratios include identifying a main peak having a main peak retention time for each of the first, the second, and the third salt gradient chromatography runs. The main peak has a main peak height corresponding to a highest absolute magnitude of a detected signal. A preceding peak having a preceding peak retention time and preceding peak height is identified, for each of the first, the second, and the third salt gradient chromatography runs. The preceding peak is adjacent to the main peak and the preceding peak retention time is less than the main peak retention time. A preceding valley having a preceding valley retention time and preceding valley height is identified, for each of the first, the second, and the third salt gradient chromatography runs, in which the preceding valley is in between the main peak and the preceding peak. The main peak height is divided by the preceding valley height to form a preceding peak-to-valley ratio for each of the first, the second, and the third salt gradient chromatography runs. A succeeding peak-to-valley ratio for each of the first, the second, and the third salt gradient chromatography runs are calculated. The calculating of the succeeding peak-to-valley ratios includes identifying a succeeding peak having a succeeding peak retention time and a succeeding peak height for each of the first, the second, and the third salt gradient chromatography runs. The succeeding peak is adjacent to the main peak and the succeeding peak retention time is greater than the main peak retention time. A succeeding valley having a succeeding valley retention time and succeeding valley height is identified for each of the first, the second, and the third salt gradient chromatography runs, in which the succeeding valley is in between the main peak and the succeeding peak. The main peak height is divided by the succeeding valley height to form a succeeding peak-to-valley ratio for each of the first, the second, and the third salt gradient chromatography runs. The preceding peak-to-valley ratio for each of the first, the second, and the third salt gradient chromatography runs are multiplied by the succeeding peak-to-valley ratio for each of the first, the second, and the third salt gradient chromatography runs, respectively, to form a product for each of the first, the second, and the third salt gradient chromatography runs. A square root of the product for each of the first, the second, and the third salt gradient chromatography runs are calculated to form a composite peak-to-valley ratio for each of the first, the second, and the third salt gradient chromatography runs. At least one of the first, the second, and the third salt gradient chromatography runs is identified as having a largest composite peak-to-valley ratio. The peak capacity algorithm includes calculating a peak capacity for each of the first, the second, and the third salt gradient chromatography runs based on an equation. The equation includes $$n' = 1 + \frac{t_g}{PWHH_M \times 1.7},$$

where n' is the peak capacity, tg is a gradient time, $PWHH_M$ is a peak width at half height for the main peak. At least one of the first, the second, and the third salt gradient chromatography runs is identified as having a largest peak capacity. The performing of the chromatography optimization algorithm identifies at least one optimized salt gradient chromatography run from the first, the second, and the third salt gradient chromatography runs based on a) the total number of peaks algorithm, b) the peak-to-valley algorithm, and/or c) the peak capacity algorithm.

In regards to any of the first embodiments, the method includes outputting on a display screen at least one optimized pH value corresponding to the at least one salt gradient chromatography run from the first, the second, and the third salt gradient chromatography runs having the largest total number of peaks in a first zone of the display screen.

In regards to any of the first embodiments, the method includes outputting on a display screen at least one optimized pH value corresponding to the at least one salt gradient chromatography run from the first, the second, and the third salt gradient chromatography runs having the largest composite peak-to-valley ratio in a second zone of the display screen.

In regards to any of the first embodiments, the method includes outputting on a display screen at least one optimized pH value corresponding to the at least one salt gradient chromatography run from the first, the second, and the third salt gradient chromatography runs having the largest peak capacity in a third zone of the display screen.

In regards to any of the first embodiments, the method can refine the salt gradient range. The method includes determining an optimized constant pH value based on the at least one optimized salt gradient chromatography run from the first, the second, and the third salt gradient chromatography runs. A first, a second, and a third refining salt gradient chromatography runs are performed using mobile phases all having the optimized constant pH value to analyze the biomolecule. The mobile phases were prepared with a same proportion of the first eluent solution and the second eluent solution. The first, the second, and the third refining salt gradient chromatography runs used a first, a second, and a third salt concentration change rates, respectively, and a same gradient time. The first, the second, and the third salt concentration change rates are different. The mobile phases having the first, the second, and the third salt concentration change rates were prepared with varying proportions of a water and a salt solution. One or more peaks are measured during each of the first, the second, and the third refining salt gradient chromatography runs. A refining chromatography optimization algorithm is performed on the measured one or more peaks of the first, the second, and the third refining gradient chromatography runs to identify at least one optimized refining salt gradient chromatography run from the first, the second, and the third refining salt gradient chromatography runs. The chromatography optimization algorithm is performed to identify at least one optimized refining salt gradient chromatography run from the first, the second, and the third refining salt gradient chromatography runs.

In regards to any of the first embodiments, the refining chromatography optimization algorithm includes a refining total number of peaks algorithm, a refining peak-to-valley algorithm, and a refining peak capacity algorithm. The refining total number of peaks algorithm that includes counting a total number of the peaks measured for each of the first, the second, and the third refining salt gradient chromatography runs, and identifying at least one of the first, the second, and the third refining salt gradient chromatography runs as having a largest total number of peaks. The refining peak-to-valley algorithm that includes calculating a preceding peak-to-valley ratio for each of the first, the second, and the third refining salt gradient chromatography runs. The calculating of the preceding peak-to-valley ratios includes identifying a main peak having a main peak retention time for each of the first, the second, and the third refining salt gradient chromatography runs. The main peak has a main peak height corresponding to a highest absolute magnitude of a detected signal. The preceding peak having a preceding peak retention time and preceding peak height identifying, for each of the first, the second, and the third refining salt gradient chromatography runs. The preceding peak is adjacent to the main peak and the preceding peak retention time is less than the main peak retention time. The preceding valley having a preceding valley retention time and preceding valley height is identified for each of the first, the second, and the third refining salt gradient chromatography runs. The preceding valley is in between the main peak and the preceding peak. The main peak height is divided by the preceding valley height to form a preceding peak-to-valley ratio for each of the first, the second, and the third refining salt gradient chromatography runs. A succeeding peak-to-valley ratio is calculated for each of the first, the second, and the third refining salt gradient chromatography runs. The calculating of the succeeding peak-to-valley ratios includes identifying a succeeding peak having a succeeding peak retention time and a succeeding peak height for each of the first, the second, and the third refining salt gradient chromatography runs. The succeeding peak is adjacent to the main peak and the succeeding peak retention time is greater than the main peak retention time. A succeeding valley having a succeeding valley retention time and succeeding valley height is identified for each of the first, the second, and the third refining salt gradient chromatography runs, in which the succeeding valley is in between the main peak and the succeeding peak. The main peak height is divided by the succeeding valley height to form a succeeding peak-to-valley ratio for each of the first, the second, and the third refining salt gradient chromatography runs. The preceding peak-to-valley ratio for each of the first, the second, and the third refining salt gradient chromatography runs are multiplied by the succeeding peak-to-valley ratio for each of the first, the second, and the third refining salt gradient chromatography runs, respectively, to form a product for each of the first, the second, and the third refining salt gradient chromatography runs. A square root of the product is calculated for each of the first, the second, and the third refining salt gradient chromatography runs to form a composite peak-to-valley ratio for each of the first, the second, and the third refining salt gradient chromatography runs. At least one of the first, the second, and the third refining salt gradient chromatography runs is identified as having a largest composite peak-to-valley ratio. The refining peak capacity algorithm includes calculating a peak capacity for each of the first, the second, and the third refining salt gradient chromatography runs based on an equation $$n' = 1 + \frac{t_g}{PWHH_M \times 1.7},$$

where n' is the peak capacity, $t_g$ is a gradient time, $PWHH_M$ is a peak width at half height for the main peak. At least one of the first, the second, and the third refining salt gradient chromatography runs is identified as having a largest peak capacity. The performing of the chromatography optimization algorithm identifies at least one optimized refining salt gradient chromatography run from the first, the second, and the third refining salt gradient chromatography runs based on a) the refining total number of peaks algorithm, b) the refining peak-to-valley algorithm, and/or c) the refining peak capacity algorithm.

In regards to any of the first embodiments, the method includes outputting on a display screen at least one optimized pH value corresponding to the at least one refining salt gradient chromatography run from the first, the second, and the third refining salt gradient chromatography runs having the largest total number of peaks in a first zone of the display screen.

In regards to any of the first embodiments, the method includes outputting on a display screen at least one optimized pH value corresponding to the at least one refining salt gradient chromatography run from the first, the second, and the third refining salt gradient chromatography runs having the largest composite peak-to-valley ratio in a second zone of the display screen.

In regards to any of the first embodiments, the method includes outputting on a display screen at least one optimized pH value corresponding to the at least one refining salt gradient chromatography run from the first, the second, and the third refining salt gradient chromatography runs having the largest peak capacity in a third zone of the display screen.

In a second embodiment, a method of determining buffer conditions for analyzing a biomolecule with a chromatography column is described using a pH gradient. The method includes performing a first, a second, and a third pH gradient chromatography runs using mobile phases having a first, a second, and a third constant salt concentrations, respectively, to analyze the biomolecule. The mobile phases have the first, the second, and the third constant salt concentrations and were prepared with a first, a second, and a third predetermined proportions of a water and a salt solution, respectively. The first, the second, and the third predetermined proportions are different. The first, the second, and the third pH gradient chromatography runs each used a same pH gradient concentration range, a same gradient time, and a same pH gradient concentration change rate. The first eluent solution includes at least four buffer salts where at least three of the four buffer salts are a monovalent buffer salt, have a net negative charge or a net neutral zwitterionic charge over a pH range of about 6 to about 10, and include a sulfonate group and an amine, where the first eluent solution has a first pH of about 6. The second eluent solution includes at least four buffer salts where at least three of the four buffer salts are a monovalent buffer salt, have a net negative charge or a net neutral zwitterionic charge over a pH range of about 6 to about 10, and include a sulfonate group and an amine, where the second eluent solution has a second pH of about 10. One or more peaks are measured during each of the first, the second, and the third pH gradient chromatography runs. A chromatography optimization algorithm is performed on the measured one or more peaks of the first, the second, and the third pH gradient chromatography runs to identify at least one optimized pH gradient chromatography run from the first, the second, and the third pH gradient chromatography runs. The performing of the chromatography optimization algorithm identifies at least one optimized pH gradient chromatography run from the first, the second, and the third pH gradient chromatography runs.

The chromatography optimization algorithm of the second embodiment is similar to the algorithm described in the first embodiment. In the second embodiment, the optimization algorithm is performed in a manner similar to the first embodiment except that the first, the second, and the third salt gradient chromatography runs are replaced with the first, the second, and the third pH gradient chromatography runs as the inputs. The performing of the chromatography optimization algorithm identifies at least one optimized pH gradient chromatography run from the first, the second, and the third pH gradient chromatography runs based on a) the total number of peaks algorithm, b) the peak-to-valley algorithm, and/or c) the peak capacity algorithm.

In regards to any of the second embodiments, the method includes outputting on a display screen at least one optimized salt concentration corresponding to the at least one pH gradient chromatography run from the first, the second, and the third pH gradient chromatography runs having the largest total number of peaks in a first zone of the display screen.

In regards to any of the second embodiments, the method includes outputting on a display screen at least one optimized salt concentration corresponding to the at least one pH gradient chromatography run from the first, the second, and the third pH gradient chromatography runs having the largest composite peak-to-valley ratio in a second zone of the display screen.

In regards to any of the second embodiments, the method includes outputting on a display screen at least one optimized salt concentration corresponding to the at least one pH gradient chromatography run from the first, the second, and the third pH gradient chromatography runs having the largest peak capacity in a third zone of the display screen.

In regards to any of the second embodiments, the method can refine the pH gradient range. The method includes determining an optimized constant salt concentration based on the at least one optimized pH gradient chromatography run from the first, the second, and the third pH gradient chromatography runs. A first, a second, and a third refining pH gradient chromatography runs are performed using mobile phases all having the optimized constant salt concentration to analyze the biomolecule. The mobile phases were prepared with a same proportion of the water and the salt solution. The first, the second, and the third refining pH gradient chromatography runs used a first, a second, and a third pH change rates, respectively, and a same gradient time. The first, the second, and the third pH change rates are different. The mobile phases having the first, the second, and the third pH change rates were prepared with varying proportions of the first eluent solution and the second eluent solution. One or more peaks are measured during each of the first, the second, and the third refining pH gradient chromatography runs. A refining chromatography optimization algorithm is performed on the measured one or more peaks of the first, the second, and the third refining pH gradient chromatography runs to identify at least one optimized refining pH gradient chromatography run from the first, the second, and the third refining pH gradient chromatography runs. The chromatography optimization algorithm is performed to identify at least one optimized refining pH gradient chromatography run from the first, the second, and the third refining pH gradient chromatography runs.

The refining chromatography optimization algorithm of the second embodiment is similar to the refining algorithm described in the first embodiment. In the second embodiment, the refining optimization algorithm is performed in a manner similar to the first embodiment except that the first, the second, and the third refining salt gradient chromatography runs of the first embodiment are replaced with the first, the second, and the third refining pH gradient chromatography runs as the inputs. The performing of the refining chromatography optimization algorithm identifies at least one optimized refining pH gradient chromatography run from the first, the second, and the third pH refining gradient chromatography runs based on a) the total number of peaks algorithm, b) the peak-to-valley algorithm, and/or c) the peak capacity algorithm.

In regards to any of the second embodiments, the method includes outputting on a display screen at least one optimized salt concentration corresponding to the at least one refining pH gradient chromatography run from the first, the second, and the third refining pH gradient chromatography runs having the largest total number of peaks in a first zone of the display screen.

In regards to any of the second embodiments, the method includes outputting on a display screen at least one optimized salt concentration corresponding to the at least one refining pH gradient chromatography run from the first, the second, and the third refining pH gradient chromatography runs having the largest composite peak-to-valley ratio in a second zone of the display screen.

In regards to any of the second embodiments, the method includes outputting on a display screen at least one optimized salt concentration corresponding to the at least one refining pH gradient chromatography run from the first, the second, and the third refining pH gradient chromatography runs having the largest peak capacity in a third zone of the display screen.

In regards to any of the above embodiments, the first eluent solution and the second eluent solution both have a total buffer salt concentration of greater than about 25 millimolar. In regards to any of the above embodiments, the first eluent solution and the second eluent solution both have a total buffer salt concentration of greater than about 250 millimolar.

In regards to any of the above embodiments, a constant pH value can refer to a pH value that does not vary by more than a predetermined amount during the chromatographic run. The predetermined amount can range from about 0 to 5 percent, and preferably is less than 1 percent of a sampled portion of the measured pH values during the chromatogram. The sampled portion where pH measurements are performed can be a fraction of the chromatogram or of the entire chromatogram. The sampled portion can be a single measurement or an average pH value for a particular time range.

In regards to any of the above embodiments, a constant salt concentration can refer to a salt concentration that does not vary by more than a predetermined amount during the chromatographic run. The predetermined amount can range from about 0 to 5 percent, and preferably is less than 1 percent of the nominal salt concentration. The salt concentration may vary due to changes in the pump sampling and mixing.

In regards to any of the above embodiments, a salt gradient concentration range includes an initial salt concentration at the beginning of the chromatogram and a final salt concentration at the end of the chromatogram (e.g., change in salt concentration per unit time). In regards to any of the above embodiments, a salt concentration change rate represents the change in salt concentration over time between the initial salt concentration and the final salt concentration. For example, the salt concentration change rate can be a linear change and characterized by a slope. In regards to any of the above embodiments, a gradient time can represent a duration of time where the pH or salt concentration is changing for the separation of the peaks.

In regards to any of the above embodiments, a pH gradient range includes an initial pH at the beginning of the chromatogram and a final pH at the end of the chromatogram (e.g., change in pH per unit time). In regards to any of the above embodiments, a pH change rate represents the change in pH over time between the initial pH and the final pH. For example, the pH change rate can be a linear change and characterized by a slope.

In regards to any of the above embodiments, the optimized chromatogram can be the chromatogram having the most resolved peaks that can be used for characterizing the sample.

In regards to any of the above embodiments, the detected signal can be a measured signal from the detector on a chromatography system. For example, the measured signal can be the absorbance value from a UV-Vis spectrophotometer. The detected signal can be an absolute value with respect to a baseline value.

In regards to any of the above embodiments, a peak height or a valley height can be the magnitude of the detected signal with respect to the baseline signal.

In regards to any of the above embodiments, the first, the second, and the third salt gradient chromatography runs can use a linear salt gradient where the salt concentration changes linearly with time for at least a portion of the chromatography run.

In regards to any of the above embodiments, the first, the second, and the third pH gradient chromatography runs can use a linear pH gradient where the pH changes linearly with time for at least a portion of the chromatography run.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention (wherein like numerals represent like elements).

FIG. 8B shows a flow chart of a method for determining buffer conditions for analyzing a biomolecule with chromatograph column using a pH gradient.

FIG. 9 shows a flow chart of a chromatography optimization algorithm that includes various algorithms for determining an optimized chromatogram for establishing buffer conditions for pH gradients or salt gradients.

DETAILED DESCRIPTION OF EMBODIMENTS

The following detailed description should be read with reference to the drawings, in which like elements in different drawings are identically numbered. The drawings, which are not necessarily to scale, depict selected embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used herein, the terms "about" or "approximately" for any numerical values or ranges indicate a suitable dimensional tolerance that allows the part or collection of components to function for its intended purpose as described herein.

A method and system for optimizing buffer conditions with liquid chromatography is described. Chromatographically characterizing and separating new biomolecule samples can be challenging when developing a method using a particular column with gradient elution where either the pH or salt concentration changes with time. Examples of biomolecules include proteins, peptides, monoclonal antibodies, oligonucleotides, glycans, and glycoproteins. Systems and methods will be described that can provide automatic optimization of a salt or pH gradient elution for reducing the time required for developing workflows in characterizing proteins. However, before describing such systems and methods, the following will describe a chromatography system suitable for use in optimizing buffer conditions.

Figure 1:
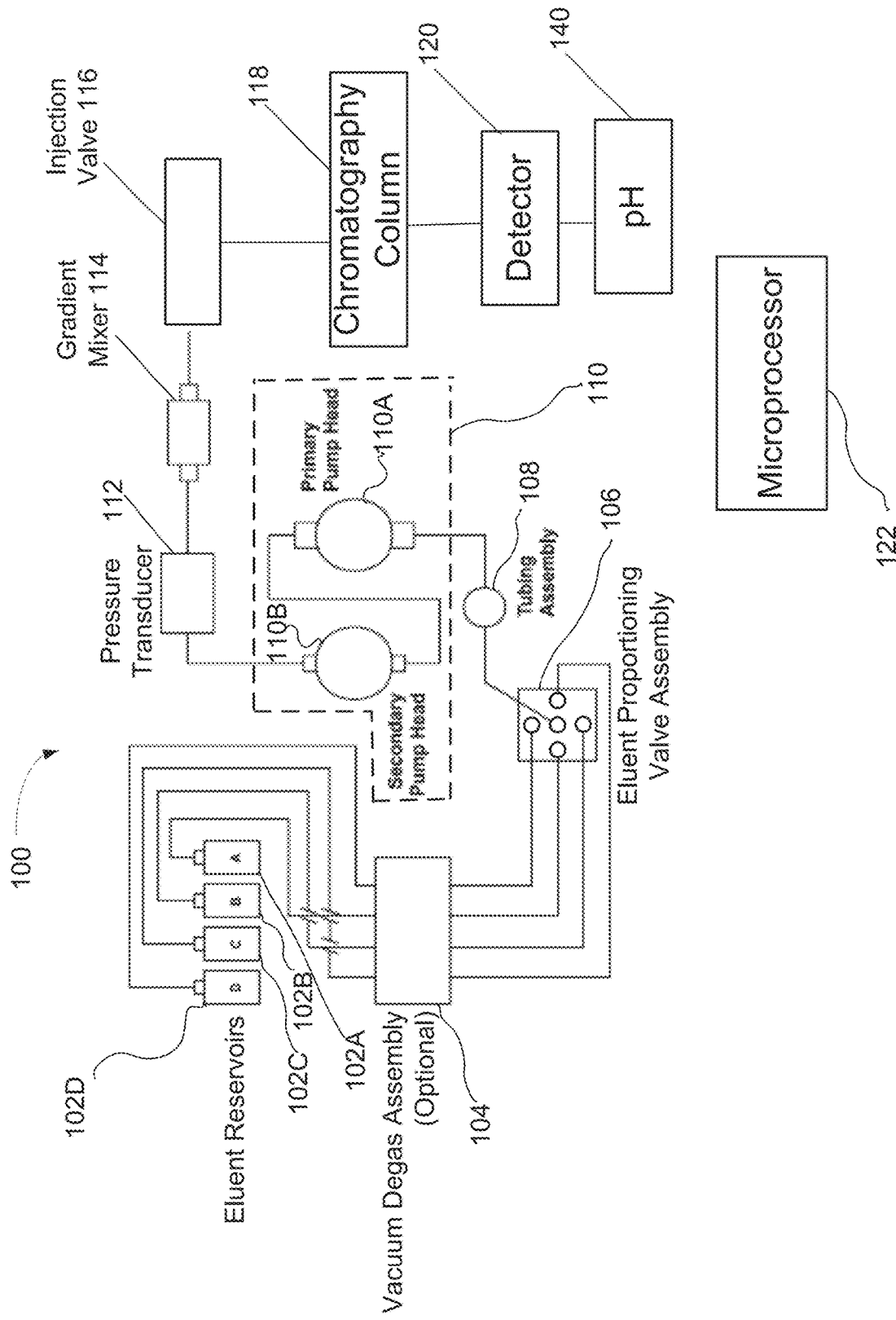
FIG. 1 illustrates a schematic of a chromatography system configured to perform a gradient elution with up to four different mobile phase reservoirs.

FIG. 1 illustrates a schematic of a chromatography system 100 configured to perform a gradient elution with up to four different mobile phase types. Chromatography system 100 can include four mobile phase reservoirs (102A, 102B, 102C, 102D), an optional degas assembly 104, an eluent proportioning valve assembly 106, a tubing assembly 108, a pump 110, a pressure transducer 112, a gradient mixer 114, an injection valve 116, a chromatography column 118, a detector 120, a pH sensor 140, and a microprocessor 122.

Pump 110 can be configured to pump a liquid from one or more reservoirs through system 100. The pumped liquid may flow through an optional degas assembly 104, and then to eluent proportioning valve assembly 106. A predetermined proportion of liquid can be extracted from each of the four mobile phase reservoirs (102A, 102B, 102C, 102D) using eluent proportioning valve assembly 106 and transmitted to tubing assembly 108 and then pump 110. Pump 110 includes a primary pump head 110A and a secondary pump head 110B. The eluent proportioning valve assembly 106 can direct pump 110 to draw on one of the four mobile phase reservoirs for a predetermined time period and then switch to another mobile phase reservoir. Typically, the pump will draw upon each of the selected mobile phase types at least once during a piston cycle to form a plurality of adjoining solvent volumes. For example, four mobile phase reservoirs (102A, 102B, 102C, 102D) can be used for the pH gradient elution. This will initially form a heterogeneous solvent volume (unmixed) containing liquid volume A, liquid volume B, liquid volume C, and liquid volume D. Note that solvent volumes A, B, C, or D can be referred to as a plug of liquid that flows through a conduit such that there is not complete homogenization between the four plugs. Solvent volumes A, B, C, or D can be in an adjoining and serial relationship. The proportion of solvent volumes A, B, C, or D depends on the timing in which eluent proportioning valve assembly 106 draws on a particular reservoir. The heterogeneous solvent volume is outputted from pump 110 and corresponds to an outputted solvent from one pump cycle. Note that the proportion of solvent volumes A, B, C, or D can change with time to form a gradient elution.

The output of pump 110 serially flows to pressure transducer 112, mixing device 114, injection valve 116, chromatography column 118, detector 120, and then to pH sensor 140. Pressure transducer 112 can be used to measure the system pressure of the mobile phase being pumped by pump 110. Injection valve 116 can be used to inject an aliquot of a sample into an eluent stream. Chromatography column 118 can be used to separate various matrix components present in the liquid sample from the analytes of interest. An output of chromatography column 118 can be fluidically connected to detector 120, and then to an optional pH sensor 140. Detector 120 can be in the form of a conductivity detector that can monitor conductivity as a function of time to identify analyte peaks or alternatively can be an ultraviolet-visible spectrophotometer to monitor an absorbance of incident light at a predetermined wavelength. Chromatography column 118 can separate one or more analytes of a sample that is outputted at different retention times.

Microprocessor 122 can include a memory portion and be used to control the operation of chromatography system 100. Microprocessor 122 may either be integrated into chromatography system 100 or be part of a personal computer that communicates with chromatography system 100. Microprocessor 122 may be configured to communicate with and control one or more components of chromatography system such as pump 110, eluent proportioning valve 106, injection valve 116, and detector 120. Memory portion can include software or firmware instructions on how to control pump 110, eluent proportioning valve 106, injection valve 116, and detector 120. Memory portion can also include software or firmware instructions on how to determine and optimize buffer conditions for separating a particular protein with a type of chromatography column.

Figure 2:
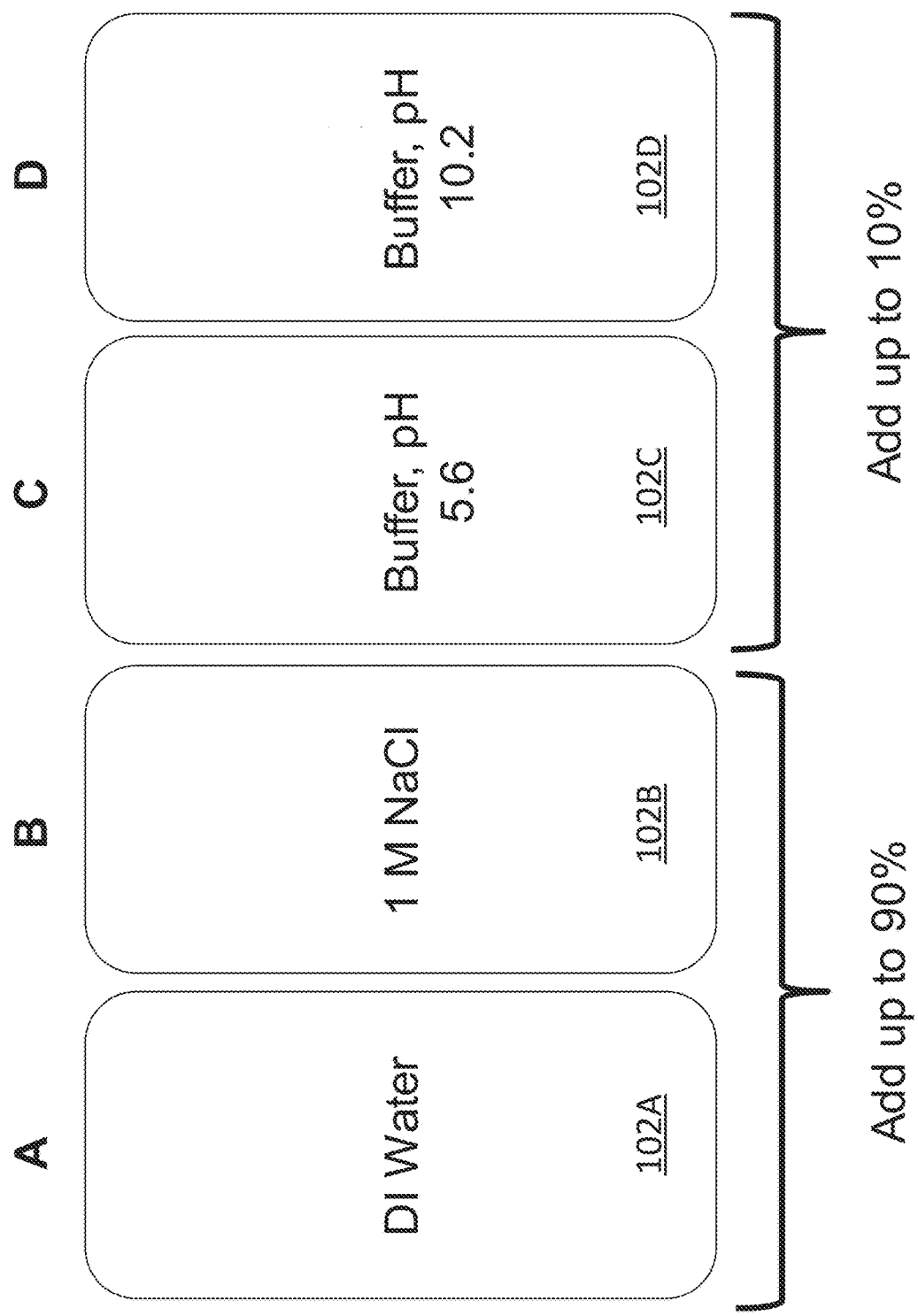
FIG. 2 illustrates a buffer system embodiment that includes four reservoirs that contain various buffer salts, water, and electrolyte salts for use in generating pH and/or salt gradients.

FIG. 2 illustrates a buffer system embodiment that includes four reservoirs (102A, 102B, 102C, 102D) that contain various buffer salts, water, and electrolyte salts for use in generating pH and/or salt gradients. In an embodiment, reservoir 102A contains water and more particularly deionized water (e.g., 1 MΩ·cm to 18 MΩ·cm). Reservoir 102B includes an electrolyte solution having a relatively high concentration of salt ranging from about 0.1 M to about 5 M. The electrolyte solution (e.g., salt solution) may include salts such as NaCl, KCl, LiCl, NaClO$_4$, LiClO$_4$, NH$_4$OAc, Na$_2$SO$_4$, (NH$_4$)$_2$SO$_4$, and/or NH$_4$Cl. Reservoir 102C may include 160 mM MES, 100 mM BES, 120 mM TAPS, and 100 mM CAPSO at pH 5.6. Reservoir 102D may include 100 mM MES, 120 mM BES, 140 mM TAPS, and 160 mM CAPSO at pH 10.2.

Mobile phase reservoirs 102C and 102D can be referred to as a first eluent solution and second eluent solution, respectively, that each include at least four buffer salts where at least three of the four buffer salts have particular properties, which are a) the buffer salts are monovalent buffer salts, b) have a net negative charge or a net neutral zwitterionic charge over a pH range of about 6 to about 10, and c) include a sulfonate group and an amine. In an embodiment, the first eluent solution may have a first pH of about 6 and total buffer salt concentration of greater than about 25 millimolar and the second eluent solution may have a second pH of about 10 and total buffer salt concentration of greater than about 25 millimolar A monovalent buffer salt is a buffer that has only one acid/base moiety. For the buffer systems described herein, the acid/base moiety should have a pKa value in between the relevant pH range, which in this case is from about pH 6 to about 10. In addition, the monovalent buffer salt can have only one of three charge states, which are a single positive charge, no net charge (i.e., neutral or zwitterionic charge), or a single negative charge.

The at least three buffer salts should each include either a net negative charge or net neutral zwitterionic charge over the pH range of about 6 to about 10 so that the buffer salts will not strongly associate with or bind to the cation exchange column. Cation exchange material usually has a negative charge for binding to positively charged cations. Thus, a net negatively charged buffer salt should not bind to the negatively charged cation exchange moieties because of ionic repulsion. A net neutral zwitterionic charged buffer salt should not bind to the negatively charged cation exchange material because of a lack of net ionic attraction between a neutral and negatively charged species. In contrast, a positively charged buffer salt should bind to the negatively charged cation exchange material because of ionic attraction. The ionic bonding of a positively charged buffer salt to the cation exchange material may affect the buffering capability of the buffer salt and interfere with the linearity of the pH gradient. In an embodiment, the buffer salts are not retained by nor completely excluded from the stationary phase in a manner that allows the buffer salts to effectively buffer both the mobile phase and the stationary phase. Note that if a buffer salt species is excluded from the stationary phase, then it cannot buffer the stationary phase and facilitate the elution of the analyte in a manner similar to other buffer salts that are not excluded from the stationary phase. Additionally, a buffer salt that is retained by the stationary phase can cause a deviation between the mobile phase pH and the stationary phase pH which is dependent upon the retention characteristics of the buffer on the stationary phase.

The at least three buffer salts should each further include a sulfonate group and an amine. In an embodiment, the amine group may be a primary, secondary, or tertiary amine. The buffer salt may be in the form where the hydrogen from the sulfonic acid group protonates the amine group to form a positively charged moiety and a negatively charged sulfonate group, which together form a zwitterion. The buffer salt may also be in the form where the protonated amine group has a negative counterion such as chloride and the sulfonate group has positive counterion such as sodium. It should be noted that many buffer salts that include a sulfonate group and an amine group may be referred to as a "Good's buffer."

Although not expressly described in the name of a particular buffer salt, a person having ordinary skill in the art will understand that the designation of the term "sulfonate" as part of the name of the buffer salt should not limit the buffer salt to only the negatively charged sulfonate state and that it can also be in the sulfonic acid form under low pH conditions. Further, a person having ordinary skill in the art will understand that the designation of the term "amine" as part of the name of a buffer salt should not limit the buffer salt to only the neutral charge free amine state and that it can also be in the protonated ammonium form with a counteranion when the buffer is slightly acidic.

In an embodiment, the first and second eluent solutions each include four buffer salts, may be the same chemical species. For example, the first eluent solution and the second eluent solution both contain the following four buffer salts, which are 2-(N-morpholino)ethanesulfonate (MES), 2-[bis (2-hydroxyethyl)amino]ethanesulfonate (BES), N-[tris(hydroxymethyl)methyl]-3-aminopropanesulfonate (TAPS), 3-(cyclohexylamino)-2-hydroxy-1-propanesulfonate (CAPSO).

The four buffer salts of the first eluent solution and second eluent solution may each include a first buffer salt that has a first pKa, a second buffer salt that has a second pKa, a third buffer salt that has a third pKa, and a fourth buffer salt that has a fourth pKa. The first pKa may be the smallest of the four pKa values and the fourth pKa may be the largest of the four pKa values. The buffer salts can be selected so that the first pKa is about the same as the first pH value and that the fourth pKa is about the same as the second pH value. More particularly, the buffer salts can be selected so that the first pKa is within 0.5 pH units of the first pH value and that the fourth pKa is within 0.5 pH units of the second pH value.

The buffer salts can also be selected so that the pKa values approximately and uniformly span between the first pH and second pH values. In an embodiment, there is a first difference between the second pKa and the first pKa that is less than about 1.5, a second difference between the third pKa and the second pKa that is less than about 1.5, and a third difference between the third pKa and the fourth pKa that is less than about 1.5. The differences of the four pKa values can be selected to range from about 0.5 to about 1.5 pH units so that there is a relatively uniform buffering capacity from the first pH to the second pH. In an embodiment, the first, second, third, and fourth pKa values may be about 6.1, 7.1, 8.4, and 9.6 at 25° C. It should be noted that all pKa values stated herein are stated with respect to 25° C. unless explicitly stated to be at a different temperature.

In an alternative embodiment, one or more of the buffer salts of the first eluent solution may be a different chemical species than the buffer salts of the second eluent solution. For example, the first eluent solution may include MES, BES, TAPS, and CAPSO and the second eluent solution may include MES, MOPS, TAPS, and CAPSO. Even though the second buffer salt of the second eluent solution is a different chemical species, this buffer combination will still provide a linear pH gradient.

In an embodiment, the buffer salt concentration values of the first eluent solution and second eluent solution may be selected to have boundary conditions. For instance, the eluent solutions can each have a lowest and a highest buffer concentration of the at least four buffer salts. The buffer salt concentration values can be selected so that the highest buffer concentration is not greater by more than about 60% of the lowest buffer concentration.

An example of selected buffer salt concentration values for the first eluent solution can include 160 mM MES, 100 mM BES, 120 mM TAPS, and 100 mM CAPSO. Here, the lowest buffer salt concentration is 100 mM for the BES and 100 mM for the CAPSO, and the highest buffer salt concentration is 160 mM for the MES. Thus, the 160 mM MES is not greater by more than 60% of the 100 mM BES or CAPSO.

An example of selected buffer salt concentration values for the second eluent solution can include 100 mM MES, 120 mM BES, 140 mM TAPS, and 160 mM CAPSO. Here, the lowest buffer salt concentration is 100 mM for the MES, and the highest buffer salt concentration is 160 mM for the CAPSO. Thus, the 160 mM CAPSO is not greater by more than 60% of the 100 mM MES.

The first and second eluent solutions can each include at least four buffer salts where at least three of four buffer salts are selected from a first buffer salt, a second buffer salt, a third buffer salt, and a fourth buffer salt. The first buffer salt may include 2-(N-morpholino)ethanesulfonate (MES). The second buffer salt may include N,N-bis(2-hydroxyethyl)-2-aminoethanesulfonate (BES) or 3-(N-morpholino)propanesulfonate (MOPS). The third buffer salt may include N-[tris(hydroxymethyl)methyl]-3-aminopropanesulfonate (TAPS) or N-(2-hydroxyethyl)piperazine-N-(4-butanesulfonate) (HEPBS). The fourth buffer salt may include 3-(cyclohexylamino)-2-hydroxy-1-propanesulfonate (CAPSO) or 2-(cyclohexylamino)ethanesulfonate (CHES). It should be noted that any combination that uses at least three of the first, second, third, or fourth buffer salts described above can provide a buffer combination suitable for generating a linear pH gradient from about pH 6 to about pH 10. In addition, the above buffer salts can be modified where the sulfonate moieties can have various alkyl chain lengths such as, for example, ethyl sulfonate, propyl sulfonate, butyl sulfonate, and hydroxypropyl sulfonate. It should be noted that the above buffer salts are exemplary and that the buffer combinations described herein for generating linear pH gradients should not be limited to the above exemplary buffer salts.

In an embodiment, for both the first eluent solution and the second eluent solution, the at least four buffer salts may be selected so that one of the at least four buffer salts do not have all of the particular properties of a) to c) described above. For example, each buffer salt can have a net negative charge or a net neutral charge over a pH range of about 6 to about 10 (feature b), but not necessarily have (features a) and c)). One or more of the buffer salts may include one or more of the following characteristics, which are being a polyvalent buffer, and not including both a sulfonate group and an amine. For example, one of the four buffer salts may be phosphate. Phosphate is only negatively charged over a pH range of about 6 to about 10, is a polyvalent buffer, and does not have an amine group or a sulfonate group. Phosphate that is used with the buffer combinations described herein may be in the form of monobasic, dibasic, and/or tribasic where the counterion is sodium and/or potassium. Other buffer salts that contain phosphate functions suitable for use in the buffer combinations described herein are pyrophosphate and tripolyphosphate.

In another embodiment, for both the first eluent solution and the second eluent solution, one or more of the buffer salts may include one or more of the following characteristics, which are having a net positive charge or a net neutral charge over a pH range of about 6 to about 10 and not include sulfonate group. For example, one of the buffer salts may be tris(hydroxymethyl)aminomethane (TRIS). TRIS can be either neutral or positively charged over a pH range of about 6 to about 10 and does not have a sulfonate group.

Surprisingly, Applicant found that the inclusion of a buffer salts that have one or more of the following characteristics such as being a polyvalent buffer salt, positively charged over a pH range of about 6 to 10, not having a sulfonate group, or not having an amine did not significantly interfere with the pH linearity of the buffer combination over the pH range so long as at least three buffer salts were included that each had the following properties, which are a) the buffer salts are monovalent buffer salts, b) have a net negative charge or a net neutral zwitterionic charge over a pH range of about 6 to about 10, and c) include a sulfonate group and an amine. Thus, the use of TRIS or phosphate as one of the buffer salts in the buffer combinations described herein can still provide a sufficiently linear pH gradient.

Figure 8A:
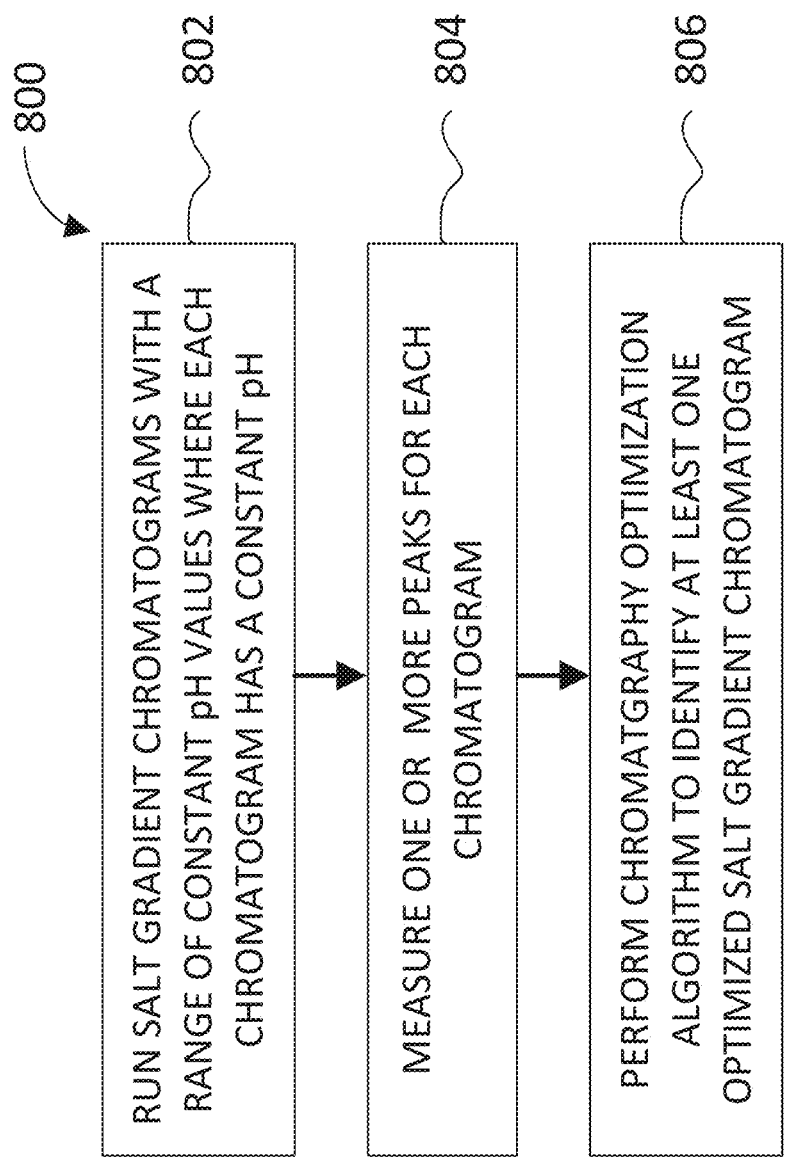
FIG. 8A shows a flow chart of a method for determining buffer conditions for analyzing a biomolecule with chromatograph column using a salt gradient.

FIG. 8A illustrates a method 800 of determining buffer conditions for analyzing a biomolecule with a chromatography column. The method includes running salt gradient chromatograms with a range of constant pH values where each chromatogram has a constant pH (a step 802), measuring one or more peaks for each chromatogram (a step 804), and performing a chromatography optimization algorithm to identify at least one optimized salt gradient chromatogram (a step 806).

In step 802, a first, a second, and a third salt gradient chromatography runs can be performed using mobile phases having a first, a second, and a third constant pH values, respectively, to analyze the biomolecule. For each run, the same sample protein can be injected into the chromatography column. The plurality of salt gradient chromatography runs can each have a different constant pH values while the change in salt concentration can be the same for each chromatography run in step 802 for screening buffer conditions. The mobile phases having the first, the second, and the third constant pH values were prepared with a first, a second, and a third predetermined proportion of a first eluent solution (eluent C) and a second eluent solution (eluent D), respectively, wherein the first, the second, and the third predetermined proportions are different. The first, the second, and the third salt gradient chromatography runs used the same gradient concentration range, change rate, and a same gradient time. For example, each chromatogram could be run with a gradient concentration range from 0 mM NaCl (initial) to 200 mM NaCl (final), a gradient time of 15 minutes, and a change rate of 13.3 mM/minute (e.g., 0 mM-200 mM/15 minutes).

A chromatography separation platform can include automating the generation of a pH or salt gradient that results in an optimized set of buffer conditions. The buffer system can include a first reservoir (eluent A, 102A), a second reservoir (eluent B, 102B), a third reservoir (eluent C, 102C), and a fourth reservoir (eluent D, 102D). In an embodiment, eluent A can be water (e.g., deionized water), eluent B can be concentrated electrolyte (e.g., 1 M NaCl), eluent C can be a first eluent solution at a first pH (e.g., pH 5.6), and eluent D can be a second eluent solution at a second pH (e.g., pH 10.2).

A ratio of the third reservoir and the fourth reservoir can be varied to control the pH of the mobile phase. If the highest pH of interest is X, the lowest pH of interest is Y, and the number of pH values to test is Z, then the increment between pH values are (X–Y)/(Z–1). Z may also be referred to as a Program Number. For example, X can be 10.2, Y can be 5.2, and Z can be 11 as implemented in Table 1 that shows eleven Program Numbers, the associated % Eluent C and % Eluent D, and calculated pH values. As verification to the pH calculation the pH values can be measured post-column as shown in Table 1. Although 11 runs are illustrated in Table 1, the program can also include a different number of chromatographic runs ranging from 3 or greater.

TABLE 1

| Program No. | % Eluent C | % Eluent D | pH (calculated) | pH (Measured) |
|---|---|---|---|---|
| I | 10 | 0 | 5.60 | 5.53 |
| II | 9 | 1 | 6.06 | 6.01 |
| III | 8 | 2 | 6.52 | 6.49 |
| IV | 7 | 3 | 6.98 | 6.98 |
| V | 6 | 4 | 7.44 | 7.50 |
| VI | 5 | 5 | 7.90 | 8.05 |
| VII | 4 | 6 | 8.36 | 8.53 |
| VIII | 3 | 7 | 8.82 | 9.01 |
| IX | 2 | 8 | 9.28 | 9.44 |
| X | 1 | 9 | 9.74 | 9.85 |
| XI | 0 | 10 | 10.20 | 10.22 |

In an embodiment, a user inputs into a chromatography data system software program the pH range (X, Y) for investigation and the number of pH values (Z) to be tested within the pH range. In an alternative embodiment, the software program may have the values X, Y, and Z as default parameters that will be automatically used absent a modification from the user. The software program can output proposed gradient conditions for eleven chromatograms to be run where each chromatogram uses a different constant pH value in accordance with Table 1. The user can have the option to modify the salt gradient parameter such as the initial salt concentration, final salt concentration, step and/or rate of change in salt concentration during the run, and duration of the run. As a default value, the initial salt concentration may be zero, the final salt concentration may be 200 mM, and the salt concentration can change linearly over an 18 minute period.

A plurality of chromatography runs can be automatically performed using the conditions from Table 1 with the same salt gradient conditions as noted in step 802. After performing the salt gradient chromatography runs, the chromatograms can be analyzed to measure one or more peaks during each of the first, the second, and the third salt gradient chromatography runs in step 804. The chromatogram data can be stored in the memory of the chromatography system and/or displayed a computer screen. For each chromatogram, factors such as the retention time of the peak, the peak height, the height of a valley in between peaks, peak width at the baseline, peak width at half height can be determined.

As a next step, step 806 can be implemented with a software program to analyze the data to identify which program number or pH condition provided the best separation of the protein sample. In an embodiment, a microprocessor can be used to automatically identify an optimized salt gradient chromatography runs as one of the first, the second, and the third salt gradient chromatography runs using a chromatography optimization algorithm. The identified and optimized salt gradient chromatography run used an optimized pH value, which can be outputted and/or stored in the memory of the chromatography system.

FIG. 9 shows a flow chart of the chromatography optimization algorithm 806 or 856 that includes a) a largest total number of peaks algorithm (a step 902), b) a peak-to-valley algorithm (a step 904), and/or c) a peak capacity algorithm (a step 906). It should be noted that step 856 is shown in FIG. 8B. After performing one or more of steps 902, 904, and 906, the chromatography optimization algorithm identifies the optimized chromatogram and associated buffer conditions (a step 908). In an embodiment, the chromatography optimization algorithm 806 automatically identifies at least one optimized salt gradient chromatography run based on a) the total number of peaks algorithm, b) the peak-to-valley algorithm, and/or c) the peak capacity algorithm. In another embodiment, the chromatography optimization algorithm 856 automatically identifies at least one optimized pH gradient chromatography run based on a) the total number of peaks algorithm, b) the peak-to-valley algorithm, and/or c) the peak capacity algorithm. It should be noted that steps 902, 904, and 906 can be referred to as subroutines of the algorithm 806 or 856. Although FIG. 9 is depicted as a flow chart, methods 806 or 856 should not be limited to only being performed in a series of steps, the steps of methods 806 or 856 can also be performed in parallel.

In step 902, the software can analyze a group of chromatograms for counting the number of peaks such as, for example, analyzing each of the eleven chromatograms run from Table 1. In general, the larger number of peaks in a chromatogram provides more information for characterizing the sample. A peak in the measured signal from the detector can be defined as relevant for further analysis when the peak is sufficiently large. In an embodiment, if a peak has an area greater than a predetermined proportion of the area of the largest main peak, then it will be used for further analysis. The predetermined proportion of the area of the largest main peak can range from 5% to 1%, be 1%, 0.5%, 0.1%, or a value less than 1% (but greater than zero). This predetermined proportion can be inputted by the user or be a default value. It should be noted that a peak represents a local maximum in the measured signal that has a tangential slope of zero. The main peak is the peak having the largest peak area in the chromatogram. A chromatogram having the largest number of peaks can be identified as the optimized chromatogram or a group of chromatograms can be identified as the optimized chromatograms that can all be tied for having the largest number of peaks. A pH value can be selected that is associated with the chromatogram having the largest number of peaks. Alternatively, the pH values associated with the group of chromatograms having greater than a threshold number of peaks can be used to calculate a selected pH value. For example, an average pH value can be calculated using all of the pH values associated with the group of chromatograms having the largest number of peaks.

It should be noted that a background correction may be done with each chromatogram to reduce the likelihood of detecting background noise as a peak. In an embodiment, a blank salt gradient or pH gradient chromatogram for each condition can be run without a sample injection to measure a background detected signal. The background signal can then be subtracted from the corresponding salt gradient or pH gradient chromatogram with the sample.

Figure 3:
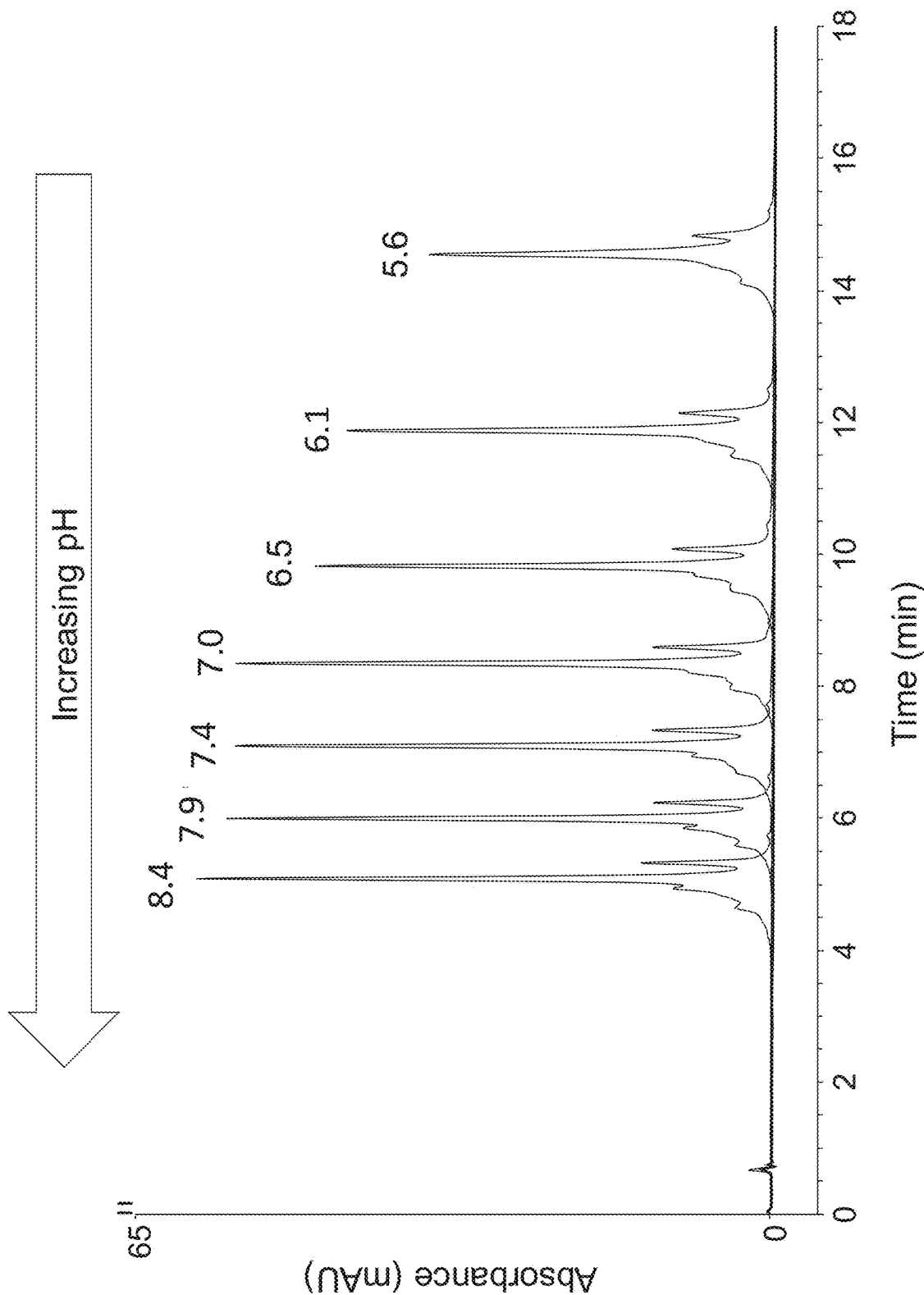
FIG. 3 illustrates a plurality of chromatograms that separates a sample containing a monoclonal antibody with a cation exchange chromatography column. The chromatograms were run with the same salt gradient at various pH levels. Each chromatogram is labeled with its nominal pH level.

The total number of peaks algorithm was performed on the chromatograms of FIG. 3. The total number of the peaks were counted for each of the first, the second, and the third salt gradient chromatography runs. Next, the salt gradient chromatography runs that have the largest total number of peaks were identified. The results are shown in Table 2 below that shows that pH values 6.5, 7.0, 7.5, 8.0, and 8.5 were tied for having the largest number of peaks.

TABLE 2

|  | # of peaks |
|---|---|
| pH 5.6 | 5 |
| pH 6.1 | 5 |
| pH 6.5 | 6 |
| pH 7.0 | 6 |
| pH 7.4 | 6 |
| pH 7.9 | 6 |
| pH 8.4 | 6 |

Figure 11:
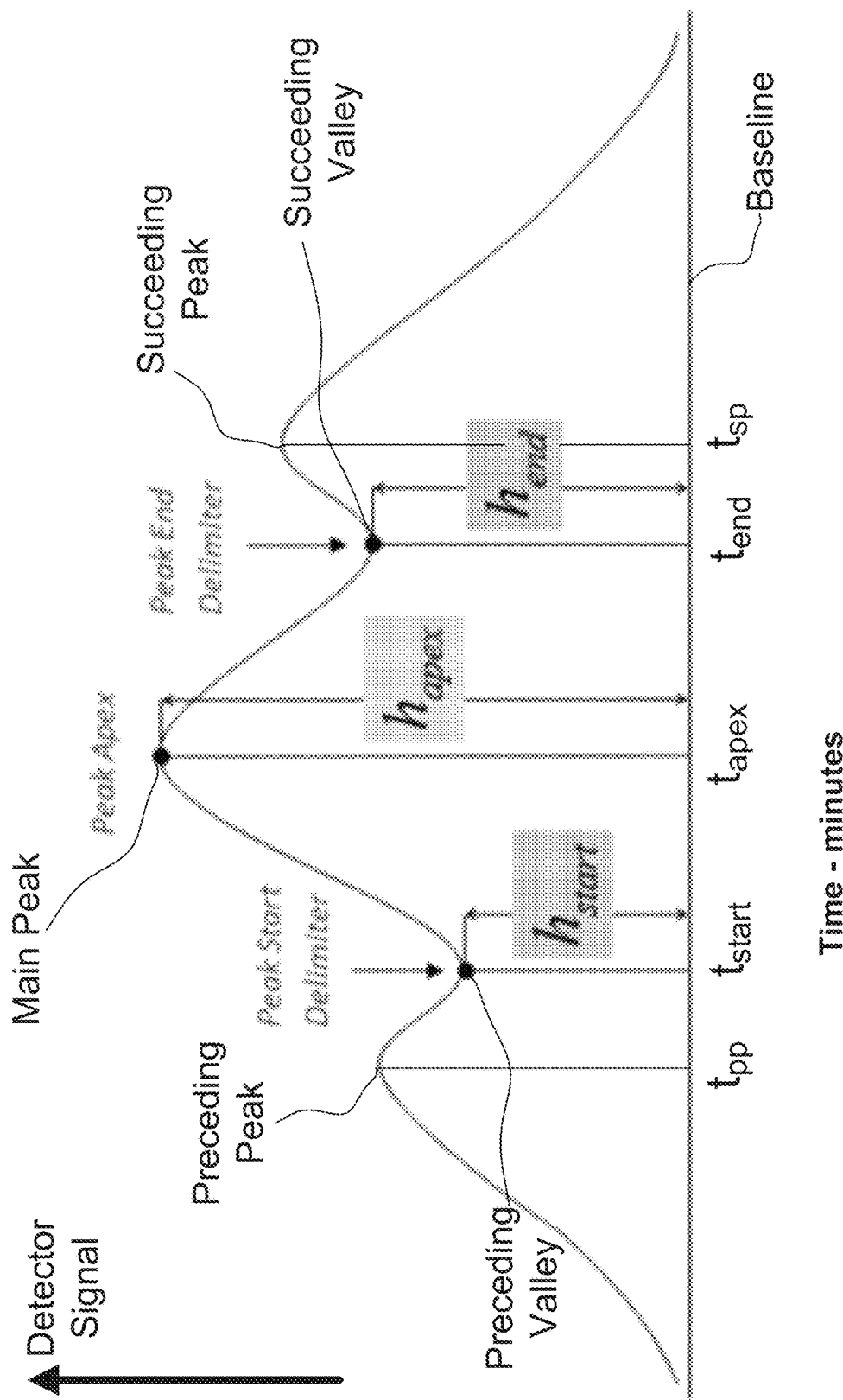
FIG. 11 shows a schematic of three chromatographic peaks and the associated values for determining a peak-to-valley ratio.

In step 904, the software can analyze a group of chromatograms for performing the peak-to-valley ratio algorithm such as, for example, analyzing each of the eleven chromatograms runs from Table 1. The peak-to-valley ratio can be used as a measure for the extent of separation of two chromatographic peaks. In this algorithm, a main peak having a main peak retention time $t_{apex}$ can be identified for each of the chromatography runs, in which the main peak has a main peak height ($h_{apex}$) corresponding to a highest absolute magnitude of a detected signal at the main peak retention time $t_{apex}$, as illustrated in FIG. 11. The detected signal can be from the detector of the chromatography system. A preceding peak and succeeding peak can be identified for each of the chromatography runs and respectfully have a preceding peak retention time $t_{pp}$ and a succeeding peak retention time $t_{sp}$. The preceding peak is adjacent to the main peak where the preceding peak retention time $t_{pp}$ is less than the main peak retention time $t_{apex}$. Similarly, the succeeding peak is adjacent to the main peak where the succeeding peak retention time $t_{sp}$ is more than the main peak retention time $t_{apex}$. The preceding peak height and the succeeding peak height both have an absolute magnitude of a detected signal that is less than main peak height. It should be noted that a mAb typically has a main peak, preceding peak, and succeeding peak where the main peak represents the main active ingredient, and the preceding peak and succeeding peak represent impurities (such as charge variants). In cation exchange chromatography, the preceding peak may be referred to as acidic and the succeeding peak may be referred to as basic. In anion exchange chromatography, the preceding peak may be referred to as basic and succeeding peak may be referred to as acidic. For hydrophobic interaction chromatography, the preceding peak may be referred to as less hydrophobic and the succeeding peak may be referred to as more hydrophobic than the main peak.

A valley is a local minimum in the measured signal that has a tangential slope of zero and is in between two peaks. In particular, a preceding valley is located in between the preceding peak and the main peak and a succeeding valley is located in between the main peak and the succeeding peak. A preceding valley has a preceding valley retention time $t_{start}$ and a succeeding valley has a succeeding valley retention time $t_{end}$. In this $t_{end}$. method, the preceding valley, the preceding valley retention time $t_{start}$, the succeeding valley, the succeeding valley retention time $t_{end}$ are identified for each of the chromatography runs, as illustrated in FIG. 11. The preceding valley has a preceding valley height ($h_{start}$) corresponding to an absolute magnitude of a detected signal at the preceding valley retention time $t_{start}$. Similarly, the succeeding valley has a succeeding valley height ($h_{end}$) corresponding to an absolute magnitude of a detected signal at the succeeding valley retention time $t_{end}$. The valley height can be measured as an absolute magnitude of the signal with respect to the baseline. The preceding valley retention time $t_{start}$ is in between preceding peak retention time $t_{pp}$ and the main peak retention time $t_{apex}$. The succeeding valley retention time $t_{end}$ is in between the main peak retention time $t_{apex}$ and the succeeding peak retention time $t_{sp}$.

A preceding peak-to-valley ratio ($PVR_p$) for the preceding valley can be calculated by dividing $h_{apex}$ with $h_{start}$ (e.g., $PVR_p = h_{apex}/h_{start}$). The preceding valley can be referred to in the context of the acidic peak. A succeeding peak-to-valley ratio ($PVR_s$) for the succeeding valley can be calculated by dividing $h_{apex}$ with $h_{end}$ (e.g., $PVR_s = h_{apex}/h_{end}$). The preceding valley can be referred to in the context of the basic peak and the succeeding valley can be referred to in the context of the acidic peak. In an embodiment, the chromatogram having the largest $PVR_p$ can be identified as the optimized chromatogram. In another embodiment, the chromatogram having the largest $PVR_s$ can be identified as the optimized chromatogram. In yet other embodiments, the following parameters can be calculated, which are a product ($PVR_p \times PVR_s$), a square root of the product (($PVR_p \times PVR_s$)$^{1/2}$), and/or a summation ($PVR_p + PVR_s$). The chromatogram having the largest product, the square root of the product, and/or summation can be identified as the optimized chromatogram. In an embodiment, only chromatograms having the largest number of peaks are subjected to the peak-to-valley ratio algorithm. It should be noted that the square root of the product ($PVR_p \times PVR_s$)$^{1/2}$ can provide a benefit in evaluating the quality of the chromatogram by favoring peak-to-valley ratios that are similar in magnitude.

The peak-to-valley ratio algorithm was performed on the chromatograms of FIG. 3. The results are shown in Table 3 below that shows that the chromatogram at pH 7.9 showed the largest $PVR_p$, $PVR_s$, and square root of the product of $PVR_p$ and $PVR_s$ can be referred to as a composite peak-tovalley ratio CPVR where $CPVR=(PVR_p \times PVR_s)^{1/2}$. Thus, in this case, the various versions of the peak-to-valley ratio algorithm indicated that pH 7.9 was the optimum value.

TABLE 3

|        | PVRp | PVRs  | CPVR  |
|--------|------|-------|-------|
| pH 5.6 | 5.36 | 8.45  | 6.73  |
| pH 6.1 | 5.60 | 13.82 | 8.79  |
| pH 6.5 | 6.08 | 17.41 | 10.28 |
| pH 7.0 | 6.48 | 18.33 | 10.90 |
| pH 7.4 | 7.31 | 18.48 | 11.62 |
| pH 7.9 | 7.48 | 20.17 | 12.28 |
| pH 8.4 | 6.62 | 17.25 | 10.69 |

In step 906, the software can analyze a group of chromatograms for performing the peak capacity algorithm such as, for example, analyzing each of the eleven chromatograms runs from Table 1. The peak capacity is used to describe the separation efficiency for gradient elution where higher peak capacity values correlate to better separations. The peak capacity equation is show in Equation 1.

$$n = 1 + \frac{t_g}{W} \quad \text{(Eq. 1)}$$

For Eq. 1, n is the peak capacity, $t_g$ is a gradient time, W is an average peak width at the baseline. The gradient time can represent a duration of time where the pH or salt concentration is changing for the separation of the peaks. For circumstances like in FIG. 3, many of the peaks were not well resolved making the determination of peak width difficult to measure and as a result W was also not easily determined. Instead, a modified peak capacity equation was proposed as shown in Equation 2.

$$n' = 1 + \frac{t_g}{PWHH_M \times 1.7} \quad \text{(Eq. 2)}$$

For Eq. 2, n' is the peak capacity, $t_g$ is a gradient time, $PWHH_M$ is a peak width at half height for the main peak. In contrast to Eq. 1, the term $PWHH_M$ does not require an average width of several peaks at the baseline where several of such peaks may be difficult to measure due to overlap. As an approximation to Eq. 1, the new Eq. 2 measures the width of the main peak its ½ height. Since the $PWHH_M$ is not measured at the baseline, an accurate measurement can be made even when there is some peak overlap at the main peak. In order to estimate the peak width at baseline (W), the $PWHH_M$ is multiplied by 1.7. Thus, Eq. 2 provides an improved way to estimate the peak capacity when there is some overlap with the main peak.

The peak capacity algorithm was performed on the chromatograms of FIG. 3. The results are shown in Table 4 below that shows that the chromatogram at pH 8.4 showed the largest n'.

TABLE 4

|        | $PWHH_M$ | n'     |
|--------|----------|--------|
| pH 5.6 | 0.108    | 82.70  |
| pH 6.1 | 0.089    | 100.14 |
| pH 6.5 | 0.080    | 111.29 |
| pH 7.0 | 0.074    | 120.24 |

TABLE 4-continued

|        | $PWHH_M$ | n'     |
|--------|----------|--------|
| pH 7.4 | 0.073    | 121.87 |
| pH 7.9 | 0.071    | 125.28 |
| pH 8.4 | 0.068    | 130.76 |

In step 908, at least one optimized salt gradient chromatography run is identified based on a) the total number of peaks algorithm (step 902), b) the peak-to-valley algorithm (step 904), and/or c) the peak capacity algorithm (step 906).

In an embodiment, a blended merit factor can be calculated by summing weighted value for the total number of peaks (TNP), the composite peak-to-valley ratio (CPVR), and the peak capacity (n') for each chromatogram. The at least one optimized salt gradient chromatography run is identified based on the run having the largest blended merit factor. The blended merit factor (BMF) can be based on Equation 3.

$$BMF = a_1 TNP + a_2 CPVR + a_3 n' \quad \text{(Eq. 3)}$$

The terms $a_1$, $a_2$, and $a_3$, represents weighting factors that can be set by a user or already stored as default values. The blended merit factor BMF can be calculated by summing weighted value for the total number of peaks (TNP), the composite peak-to-valley ratio (CPVR), and the peak capacity (n') for each chromatogram.

In another embodiment, a blended rank analysis can be calculated by ranking the order of the analyzed chromatograms for each of the subroutines of step 902, 904, and 906. For example, Tables 2-4 show that pH's 6.5 to 8.4 were tied for the greatest TNP, pH 7.9 showed the greatest CPVR, and pH 8.4 showed the greatest n'. Thus, pH 8.4 could be selected as the optimized chromatogram since it had a primary ranking for two out of the three subroutines.

Figure 5:
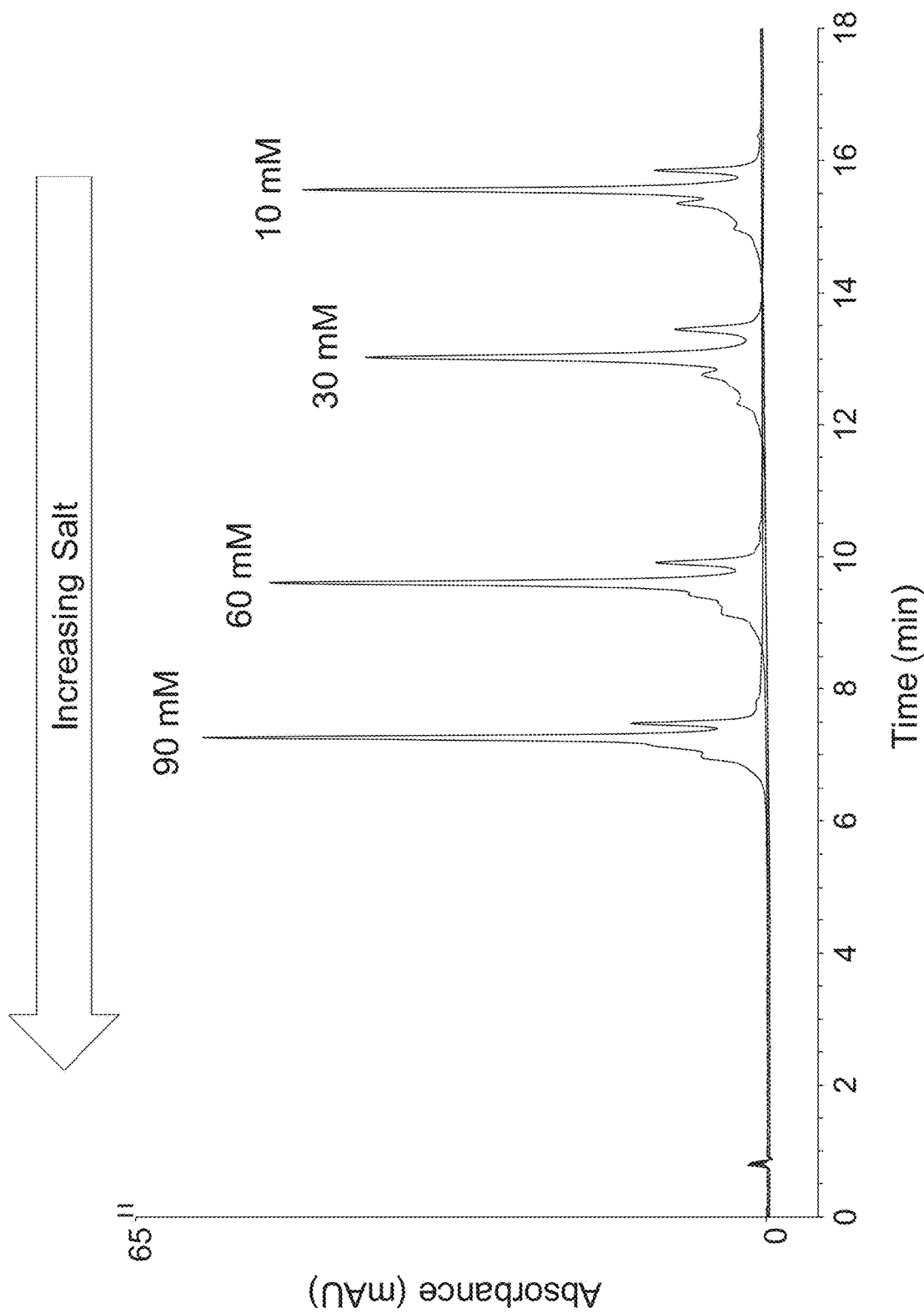
FIG. 5 illustrates a plurality of chromatograms that separates a sample containing a monoclonal antibody with a cation exchange chromatography column. The chromatograms were run with the same pH gradient at various salt levels. Each chromatogram is labeled with its nominal salt concentration.

The chromatography optimization algorithm 856 can also be performed with the chromatographic data of FIG. 5. The output of algorithm 856 is shown in Table 5 below.

TABLE 5

| NaCl Concentration | TNP | CPVR  | n'     |
|--------------------|-----|-------|--------|
| 10 mM              | 4   | 10.30 | 123.55 |
| 30 mM              | 5   | 11.44 | 92.91  |
| 60 mM              | 5   | 9.91  | 111.29 |
| 90 mM              | 4   | 7.37  | 128.88 |

Using the blended rank analysis, Table 5 show that 30 mM and 60 mM NaCl were tied for the greatest TNP, 30 mM NaCl showed the greatest CPVR, and 90 mM NaCl showed the greatest n'. Thus, 30 mM could be selected as the optimized chromatogram since it had a primary ranking for two out of the three subroutines.

Figure 6:
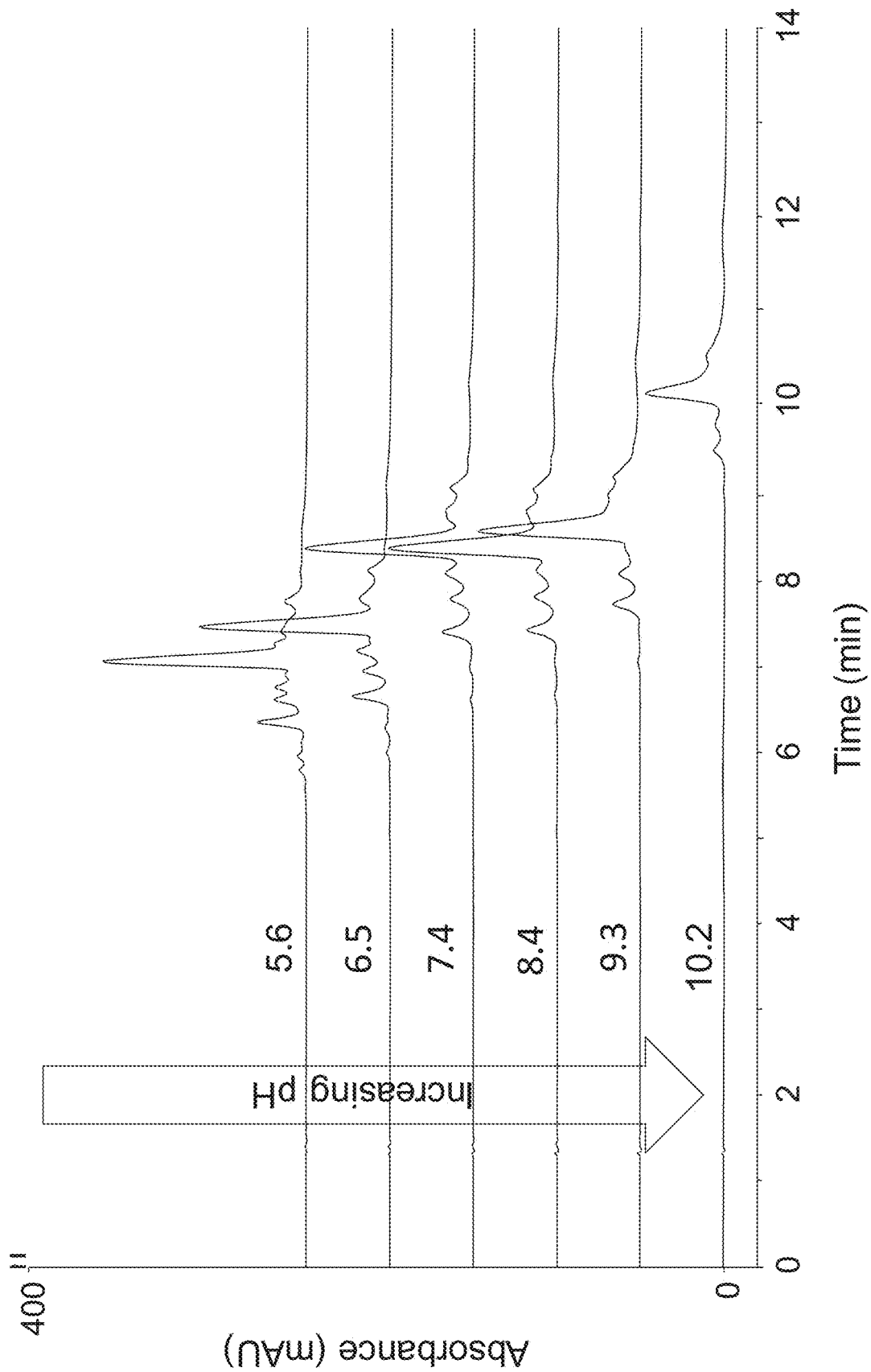
FIG. 6 illustrates a plurality of chromatograms that separates a sample containing a protein (ovalbumin) with an anion exchange chromatography column. The chromatograms were run with the same salt gradient at various pH levels. Each chromatogram is labeled with its nominal pH level.

The chromatography optimization algorithm 806 can also be performed with the chromatographic data of FIG. 6. The output of algorithm 806 is shown in Table 6 below.

TABLE 6

|         | TNP | CPVR | n'    |
|---------|-----|------|-------|
| pH 5.6  | 14  | 8.57 | 86.25 |
| pH 6.5  | 13  | 9.54 | 79.96 |
| pH 7.4  | 11  | 9.61 | 66.36 |
| pH 8.4  | 12  | 8.98 | 65.64 |
| pH 9.3  | 10  | 7.06 | 63.58 |
| pH 10.2 | 6   | 9.58 | 62.92 |

Using the blended rank analysis, Table 6 show that pH 5.6 had the greatest TNP, pH 7.4 had the greatest CPVR, and pH 5.6 showed the greatest n'. Thus, pH 5.6 could be selected as the optimized chromatogram since it had a primary ranking for two out of the three subroutines.

Figure 7:
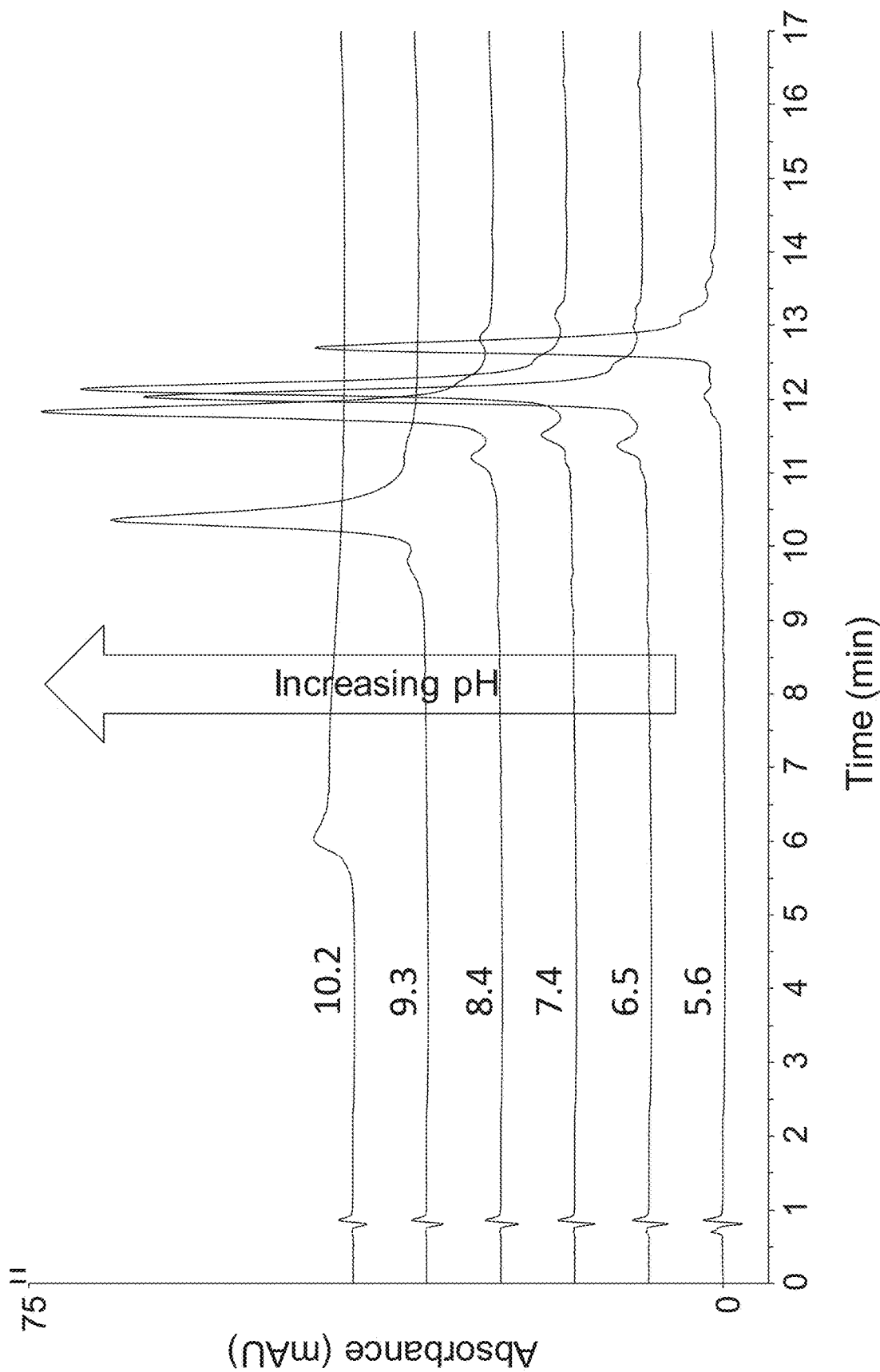
FIG. 7 illustrates a plurality of chromatograms that separates a sample containing a monoclonal antibody with a hydrophobic interaction chromatography column. The chromatograms were run with the same salt gradient at various pH levels. Each chromatogram is labeled with its nominal pH value.

The chromatography optimization algorithm 806 can also be performed with the chromatographic data of FIG. 7. The output of algorithm 806 is shown in Table 7 below.

TABLE 7

|  | TNP | CPVR | n' |
|---|---|---|---|
| pH 5.6 | 7 | 17.37 | 41.369 |
| pH 6.5 | 7 | 18.97 | 43.017 |
| pH 7.4 | 5 | 20.28 | 42.592 |
| pH 8.4 | 6 | 17.42 | 41.172 |
| pH 9.3 | 6 | 16.95 | 33.551 |
| pH 10.2 | 1 | n.a. | n.a. |

Using the blended rank analysis, Table 7 show that pH 5.6 and 6.5 had the greatest TNP, pH 7.4 had the greatest CPVR, and pH 6.5 showed the greatest n'. Thus, pH 6.5 could be selected as the optimized chromatogram since it had a primary ranking for two out of the three subroutines.

Figure 10A:
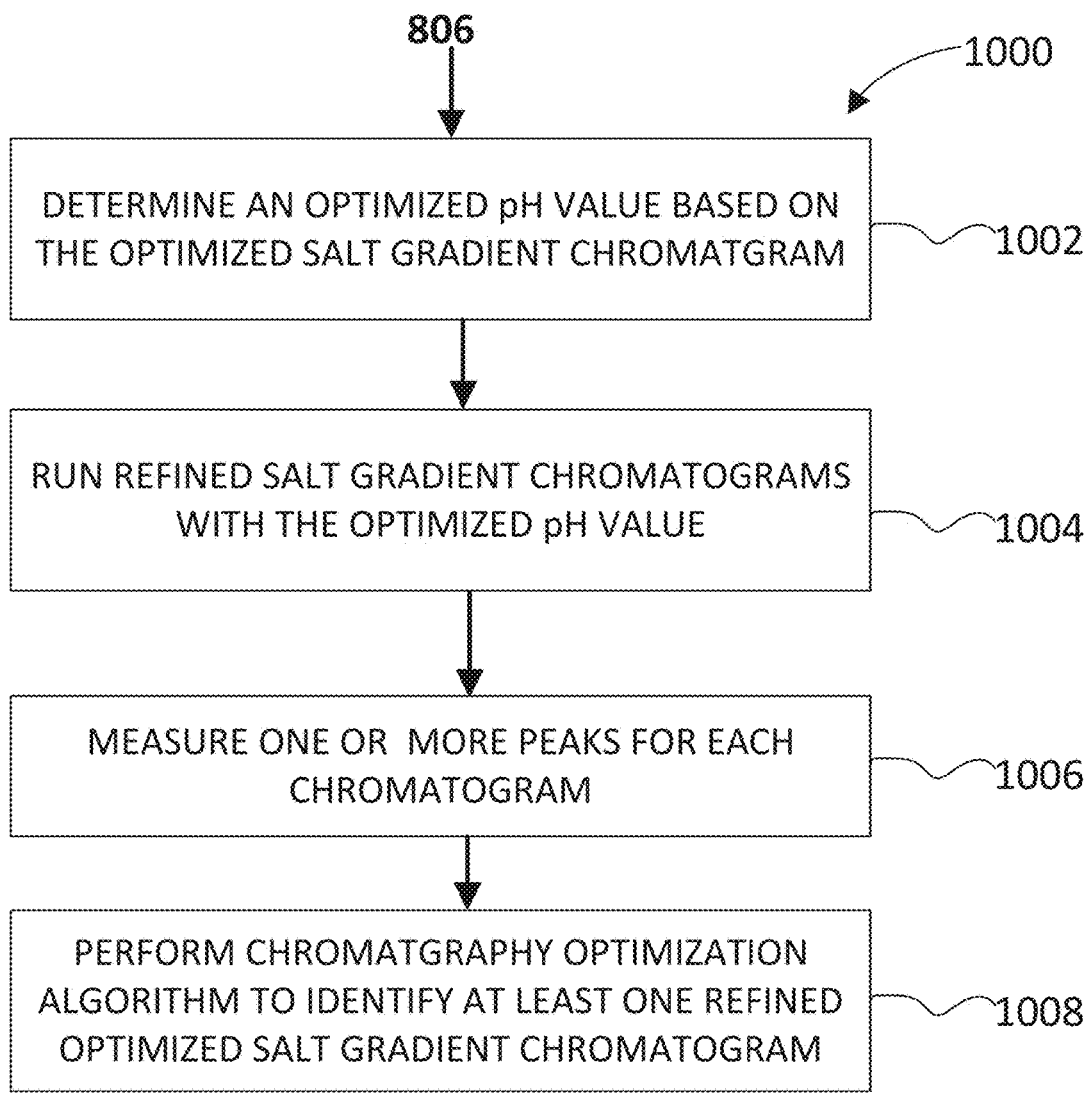
FIG. 10A shows a flow chart of a method for determining refined buffer conditions subsequent to an initial screening for determining buffer conditions with a salt gradient.

After performing the chromatography optimization algorithm 806 as an initial screen, a method 1000 for determining refined buffer conditions can be performed, as shown in FIG. 10A. The method 1000 includes determining an optimized pH value based on the optimized salt gradient chromatogram in a step 1002, running a refined salt gradient chromatograms with the optimized pH value in a step 1004, measuring one or more peaks for each chromatogram in a step 1006, and performing a chromatography optimization algorithm to identify at least one refined optimized salt gradient chromatogram in a step 1008.

The optimized chromatogram identified in method 806 can be used to determine the optimized pH value in step 1002. A constant pH value can be determined based on the identified and optimized chromatogram. In addition, a refined salt concentration range can be determined based on the time interval where the peaks elute. The refined salt gradient has a narrower range of salt concentrations for improving the resolution of the peaks analyzed in the chromatogram. The identified constant pH can be used for performing additional chromatograms for refining the salt gradient as a second stage of screening (step 1004). The identified pH value can be associated with a particular value of % Eluent C ($C_M$) and % Eluent D ($D_M$) for use in the second stage for refining the salt gradient range. The software program can generate a 5 post-script sequence with the same gradient time duration, but with different gradient starting and ending points, as shown in Table 8. Although a 5 post-script sequence is illustrated in Table 8, the program can also include a range of post-script sequence values from 2 or greater. For Table 8, the values of X and Y can be set by the user or can be default parameters. In an embodiment, the values of X and Y can be any number so long as the condition $0<X<Y<90$ remains true. It should be noted that 90 is an exemplary number and that other numbers may suitable to use when establishing boundary conditions for X and Y. In most situations, X and Y values are determined based on the optimized chromatogram of the previous set of chromatogram results (e.g., the chromatogram having a constant pH of 8 in FIG. 3). X can correspond to the % B where the first peak elutes and Y can correspond to the % B where the last peak elutes. Alternatively, X and Y can both correspond the % B where the main peak elutes to refine the resolution around the main peak.

TABLE 8

| | Gradient Starting Point | | | | Gradient Ending Point | | | |
|---|---|---|---|---|---|---|---|---|
| Program | A (%) | B (%) | C (%) | D (%) | A (%) | B (%) | C (%) | D (%) |
| 1 | 90 | 0 | $C_M$ | $D_M$ | 0 | 90 | $C_M$ | $D_M$ |
| 2 | 90 − X + 10 | X − 10 | $C_M$ | $D_M$ | 90 − Y − 10 | Y + 10 | $C_M$ | $D_M$ |
| 3 | 90 − X + 5 | X − 5 | $C_M$ | $D_M$ | 90 − Y − 5 | Y + 5 | $C_M$ | $D_M$ |
| 4 | 90 − X + 3 | X − 3 | $C_M$ | $D_M$ | 90 − Y − 3 | Y + 3 | $C_M$ | $D_M$ |
| 5 | 90 − X + 1 | X − 1 | $C_M$ | $D_M$ | 90 − Y − 1 | Y + 1 | $C_M$ | $D_M$ |

A plurality of refined chromatograms can be run using a variety of salt gradient parameters of Table 8 with the optimized pH level being fixed for each of the chromatograms during this second screening. Next, the refined salt gradient chromatograms can be analyzed to measure one or more peaks during each of the first, the second, and the third salt gradient chromatography runs in step 1006. The resulting chromatograms can be analyzed with the optimization algorithm 806 to determine the optimized refined salt gradient chromatogram along with a refined salt concentration range (step 1008). The optimized buffer conditions can now be outputted and/or optimized buffer conditions implemented can be implemented with the chromatography system for performing additional sample analysis. Alternatively, the values of X and Y of Table 8 can be determined again in an iterative manner where another plurality of chromatograms can be run using a variety of salt gradient parameters of Table 8 with the pH level being fixed for each of the chromatograms during a third screening. For example, if Program 3 from Table 8 was found to be the most optimal of the programs, a further optimization could be undertaken over a narrower operating range to further improve the separation as shown in Table 8a below.

TABLE 8a

| Program | Gradient Starting Point | | | | Gradient Ending Point | | | |
|---|---|---|---|---|---|---|---|---|
| | A (%) | B (%) | C (%) | D (%) | A (%) | B (%) | C (%) | D (%) |
| 1 | 90 − X + 6 | X − 6 | $C_M$ | $D_M$ | 90 − Y − 6 | Y + 6 | $C_M$ | $D_M$ |
| 2 | 90 − X + 5 | X − 5 | $C_M$ | $D_M$ | 90 − Y − 5 | Y + 5 | $C_M$ | $D_M$ |
| 3 | 90 − X + 4 | X − 4 | $C_M$ | $D_M$ | 90 − Y − 4 | Y + 4 | $C_M$ | $D_M$ |

Now that a salt gradient optimization method has been described, the following will describe a pH gradient optimization method. FIG. 8B illustrates a method 850 of determining buffer conditions for analyzing a biomolecule with a chromatography column. The method includes running pH gradient chromatograms with a range of constant salt concentrations where each chromatogram has a constant salt concentration (a step 852), measuring one or more peaks for each chromatogram (a step 854), and performing a chromatography optimization algorithm to identify at least one optimized pH gradient chromatogram (a step 856).

The software program can output proposed pH gradient conditions for four chromatograms to be run where each chromatogram uses a different constant salt concentration pH value in accordance with Table 9. For pH gradient method scouting, the method is defined by holding A and B constant while varying C and D over time. Assuming eluent B contains z M of electrolyte. The mobile phase electrolyte concentration is equal to z*% B. For each Program, the pH gradient conditions can be the same.

TABLE 9

| Program | % Eluent A | % Eluent B |
|---|---|---|
| I | 90 − z/100 | z/100 |
| II | 90 − 3z/100 | 3z/100 |
| III | 90 − 6z/100 | 6z/100 |
| IV | 90 − 9z/100 | 9z/100 |

A plurality of pH gradient chromatography runs can be automatically performed using the conditions from Table 9 with the same pH gradient conditions. Although 4 runs are illustrated in Table 9, the program can also include a different number of chromatographic runs ranging from 3 or greater. After performing the pH gradient chromatography runs, the chromatograms can be analyzed to measure one or more peaks during each of the first, the second, and the third pH gradient chromatography runs. For each chromatogram, factors such as the retention time of the peak, the peak height, the height of a valley in between peaks, peak width at the baseline, peak width at half height can be determined.

As a next step, a software program can analyze the data to identify which program number or salt condition provided the best separation of the biomolecule sample. A microprocessor can be used to identify an optimized pH gradient chromatography runs as one of the first, the second, and the third pH gradient chromatography runs using a chromatography optimization algorithm 856. It should be noted that the chromatography optimization algorithm is essentially the same for both the salt gradient chromatography runs and pH chromatography runs (806 and 856). The optimization algorithm for the pH gradient chromatograms 856 is performed in a manner similar to the optimization algorithm for the salt gradient chromatograms 806 in that the first, the second, and the third salt gradient chromatography runs are replaced with the first, the second, and the third pH gradient chromatography runs as the inputs into the optimization algorithm. The identified and optimized pH gradient chromatography run used an optimized salt concentration value, which can be outputted and/or stored in the memory of the chromatography system. In an embodiment, the chromatography optimization algorithm identifies at least one optimized pH gradient chromatography run based on a) the total number of peaks algorithm, b) the peak-to-valley algorithm, and/or c) the peak capacity algorithm.

Figure 10B:
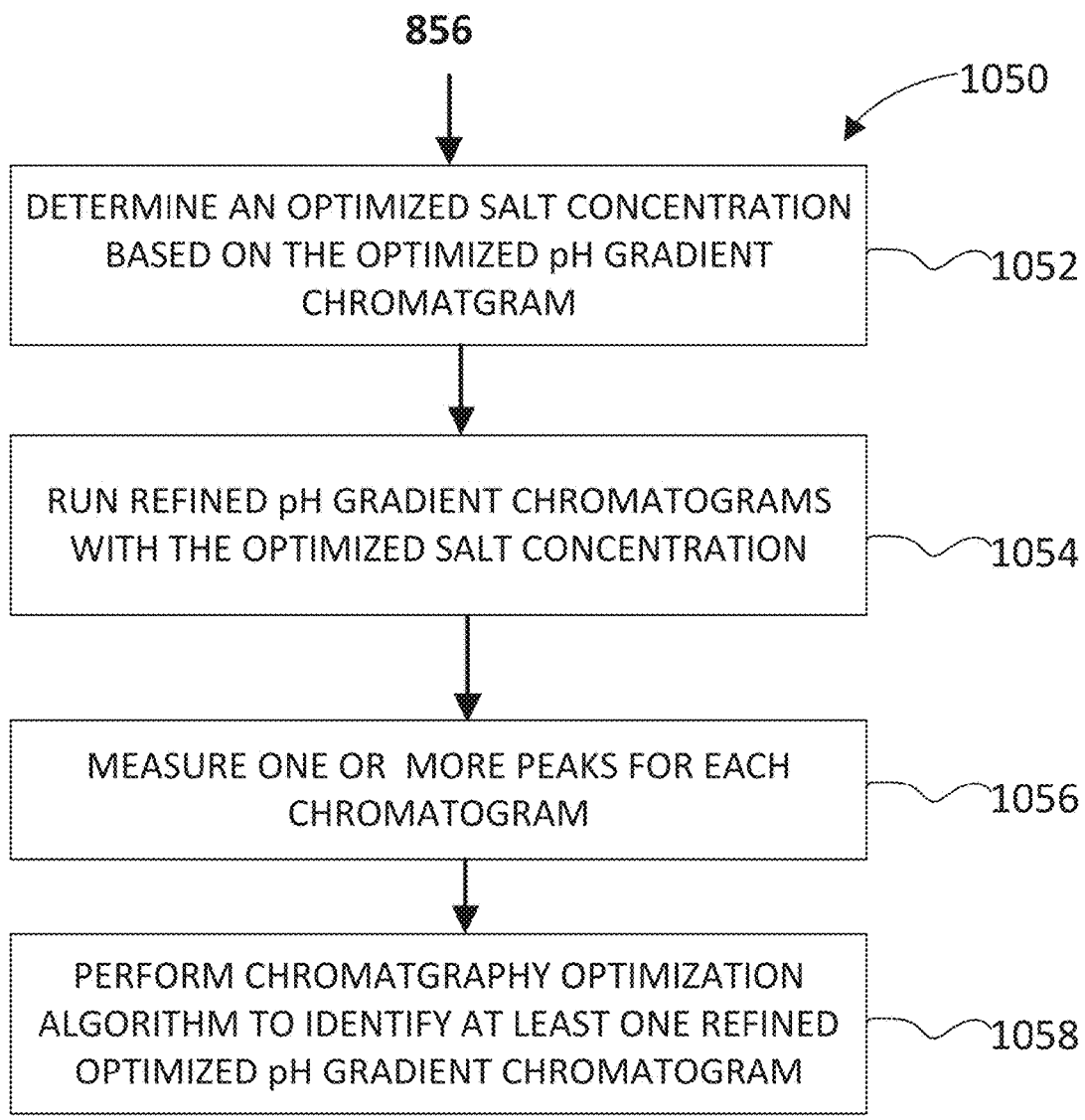
FIG. 10B shows a flow chart of a method for determining refined buffer conditions subsequent to an initial screening for determining buffer conditions with a pH gradient.

After performing the chromatography optimization algorithm 856 as an initial screen for the pH gradient chromatography runs, a method 1050 for determining refined buffer conditions can be performed, as shown in FIG. 10B. The method 1050 includes determining an optimized salt concentration based on the optimized pH gradient chromatogram in a step 1052, running refined pH gradient chromatograms with the optimized salt concentration in a step 1054, measuring one or more peaks for each chromatogram in a step 1056, and performing a chromatography optimization algorithm to identify at least one refined optimized pH gradient chromatogram in a step 1058.

The optimized chromatogram identified can be used to determine the optimized salt concentration. A constant salt concentration can be determined based on the identified and optimized chromatogram. In addition, a refined pH range can be determined based on the time interval where the peaks elute. The refined pH gradient has a narrower range of pH values for improving the resolution of the peaks analyzed in the chromatogram. The identified constant salt concentration can be used for performing additional chromatograms for refining the pH gradient as a second stage of screening. The identified salt concentration can be associated with a particular value of % Eluent A ($A_M$) and % Eluent B ($B_M$) for use in the second stage for refining the pH gradient range. The software program can generate a 5 post-script sequence with the same gradient time duration, but with different gradient starting and ending points, as shown in Table 10. Although a 5 post-script sequence is illustrated in Table 10, the program can also include a range of post-script sequence values from 2 or greater. For Table 10, the values of X and Y can be set by the user or can be default parameters. X can correspond to the % D where the first peak elutes and Y can correspond to the % D where the last peak elutes in the pH gradient method (0<X<Y<10).

TABLE 10

| Program | Gradient Starting Point | | | | Gradient Ending Point | | | |
|---|---|---|---|---|---|---|---|---|
| | A (%) | B (%) | C (%) | D (%) | A (%) | B (%) | C (%) | D (%) |
| 1 | $A_M$ | $B_M$ | 10 | 0 | $A_M$ | $B_M$ | 0 | 10 |
| 2 | $A_M$ | $B_M$ | 10 − X + 2.0 | X − 2.0 | $A_M$ | $B_M$ | 10 − Y + 2.0 | Y − 2.0 |
| 3 | $A_M$ | $B_M$ | 10 − X + 1.5 | X − 1.5 | $A_M$ | $B_M$ | 10 − Y + 1.5 | Y − 1.5 |
| 4 | $A_M$ | $B_M$ | 10 − X + 1.0 | X − 1.0 | $A_M$ | $B_M$ | 10 − Y + 1.0 | Y − 1.0 |
| 5 | $A_M$ | $B_M$ | 10 − X + 0.5 | X − 0.5 | $A_M$ | $B_M$ | 10 − Y + 0.5 | Y − 0.5 |

A plurality of refined chromatograms can be run using a variety of pH gradient parameters of Table 10 with the optimized salt concentration level being fixed for each of the chromatograms during this second screening. Next, the refined pH gradient chromatograms can be analyzed to measure one or more peaks during each of the first, the second, and the third pH gradient chromatography runs. The resulting chromatograms can be analyzed with the optimization algorithm 856 to determine the optimized refined pH gradient chromatogram along with a refined pH range. The optimized buffer conditions can now be outputted and/or optimized buffer conditions implemented can be implemented with the chromatography system for performing additional sample analysis. Alternatively, the values of X and Y of Table 10 can be determined again in an iterative manner where another plurality of chromatograms can be run using a variety of salt gradient parameters of Table 10 with the salt concentration being fixed for each of the chromatograms during a third screening. For example, if Program 3 from Table 10 was found to be the most optimal of the programs, a further optimization could be undertaken over a narrower operating range to further improve the separation as shown in Table 10a below.

TABLE 10a

| Program | Gradient Starting Point | | | | Gradient Ending Point | | | |
|---|---|---|---|---|---|---|---|---|
| | A (%) | B (%) | C (%) | D (%) | A (%) | B (%) | C (%) | D (%) |
| 1 | $A_M$ | $B_M$ | 10 − X + 1.8 | X − 1.8 | $A_M$ | $B_M$ | 10 − Y + 1.8 | Y − 1.8 |
| 2 | $A_M$ | $B_M$ | 10 − X + 1.5 | X − 1.5 | $A_M$ | $B_M$ | 10 − Y + 1.5 | Y − 1.5 |
| 3 | $A_M$ | $B_M$ | 10 − X + 1.3 | X − 1.3 | $A_M$ | $B_M$ | 10 − Y + 1.3 | Y − 1.3 |

Example 1—Chromatograms of a mAb Sample Using a Salt Gradient at Various pH Conditions on a Cation Exchange Column A Thermo Scientific Vanquish Flex liquid chromatography system 100 (commercially available from Dionex Softron GmbH, Germering, Germany) was set up in a manner similar to FIG. 1. A Thermo Scientific Vanquish F Autosampler (commercially available from Dionex Softron GmbH, Germering, Germany) was used with the system and configured to have a 25 μL sample loop. A cation exchange chromatography column 118 (Thermo Scientific ProPac WCX-10 column, 10 micron particle size diameter, weak cation exchange groups, 4×150 mm—diameter×length) was installed into the system 100. A quaternary pump (106, 108, 110) was used to pump a combination of 4 different reservoirs (102A, 102B, 102C, 102D) into the chromatography column for generating the mobile phase. The pump flow rate was set to 1 mL/minute. The column 118 was placed in a thermal compartment that was operated at a temperature at around 30° C. Detector 120 (Vanquish F, Thermo Scientific Dionex, Sunnyvale, Calif., U.S.A.) was in the form of a UV-VIS spectrophotometer and set to the wavelength of 280 nanometers. After detector 120, a pH and conductivity sensor 140 (UltiMate 3000 PCM-3000, Thermo Scientific Dionex, Sunnyvale, Calif., U.S.A.) was placed to monitor the pH of the eluent.

Four mobile phase reservoirs (102A, 102B, 102C, 102D) respectively contained the following eluent solutions. Eluent A: deionized water; Eluent B: 4 M sodium chloride in water; Eluent C: 160 mM MES, 100 mM MOPS, 120 mM TAPS, 100 mM CAPSO in water at pH 5.6; Eluent D: 100 mM MES, 120 MOPS, 140 mM TAPS, 160 mM CAPSO in water at pH 10.2. The pump was configured to provide a salt gradient mobile phase using a proportion of four eluent solutions. The salt gradient was established by linearly varying the electrolyte concentration from 0 to 200 mM NaCl over a 15 minute period (90% A+0% B to 70% A+20% B). The sum of % A and % B was set to be equal to 90%. A salt gradient was run with various constant pH values that were 5.6, 6.0, 6.5, 7.0, 7.5, 8.0, and 8.5. The proportion of mobile phase C and mobile phase D was modified to obtain different pH conditions while maintaining the sum of % C and % D to be equal to 10%. It should be noted that in this Example the % C and % D remain constant during each chromatography run.

Although the conditions of A+B has been set to 90% and C+D=10%, the summations of A+B and C+D can each be set to other values so long as the summation of C+D is sufficient to buffer the mobile phase.

Figure 4:
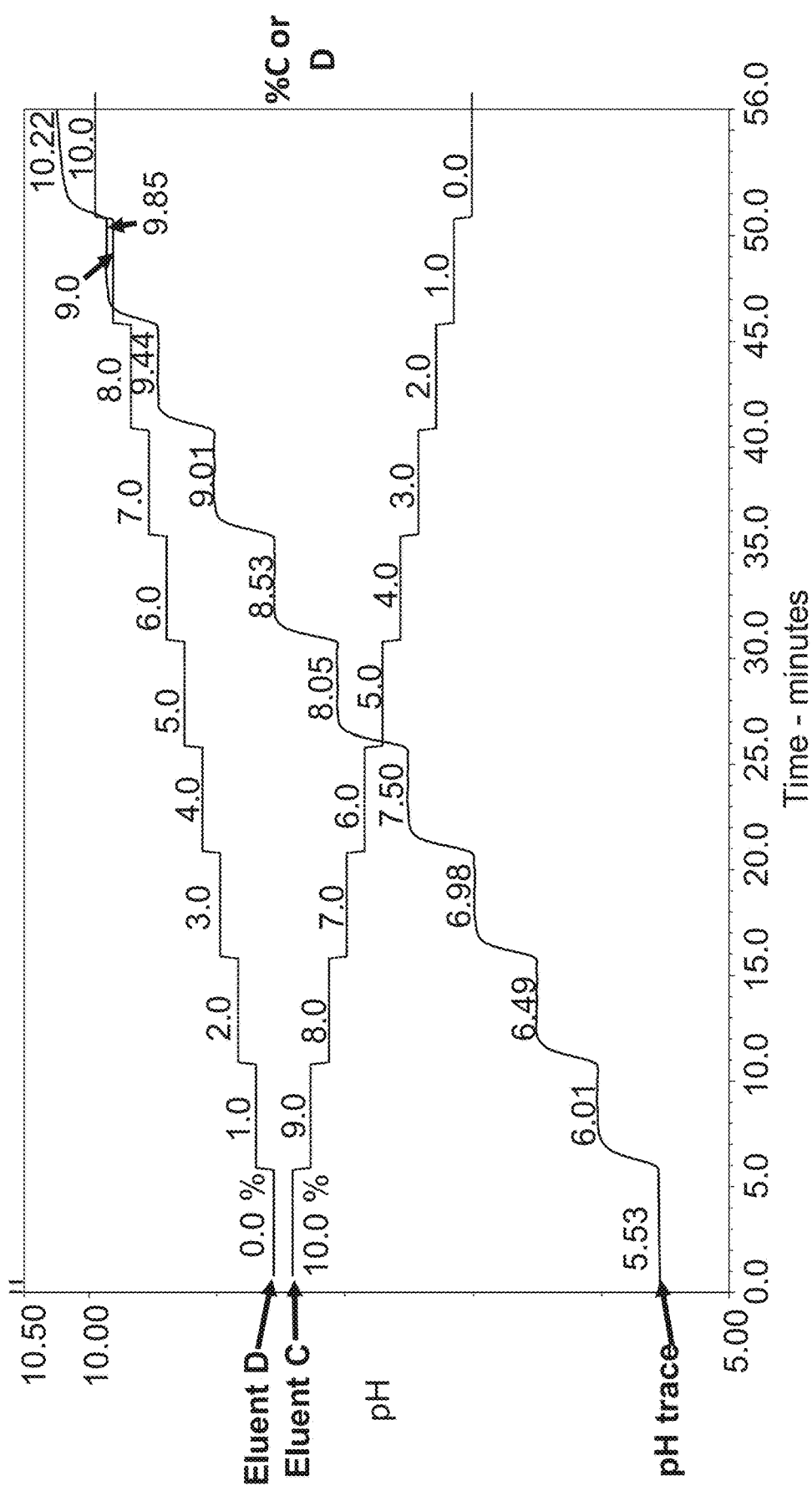
FIG. 4 illustrates the measured pH as a function of the % of Eluent C and the % of Eluent D pumped into the chromatography column.

FIG. 4 shows a pH trace that monitors the pH at the pH sensor 140 for various combinations of Eluents C and D. FIG. 3 shows a plurality of chromatograms separating a sample containing the mAb (Rituximab biosimilar) at a concentration of 5 mg/mL using a salt gradient where each chromatogram was run using a different pH value. The peak resolution generally improved at higher pH values.

Example 2—Chromatograms of a mAb Sample Using a pH Gradient at Various Salt Conditions on a Cation Exchange Column A liquid chromatography system similar to Example 1 was used in this Example. In contrast to the salt gradient of Example 1, this Example used a pH gradient by linearly varying the buffer reservoirs 10% C+0% D to 0% C+10% D over a 15 minute period from pH 5.6 to 10.2. The sum of % C and % D was set to be equal to 10%. A pH gradient was run with various constant electrolyte values that were 10, 30, 60, and 90 mM NaCl. The proportion of mobile phase A and mobile phase B was modified to obtain different salt concentrations while maintaining the sum of % C and % D to be equal to 10%. It should be noted that in this Example the % A and % B remain relatively constant during each chromatography run. Table 11 shows the proportions of A and B that allowed for different salt concentrations.

TABLE 11

| % Eluent A | % Eluent B | NaCl (mM) |
| --- | --- | --- |
| 89 | 1 | 10 |
| 87 | 3 | 30 |
| 84 | 6 | 60 |
| 81 | 9 | 90 |

FIG. 5 shows a plurality of chromatograms separating a sample containing the mAb (Rituximab biosimilar) at a concentration of 5 mg/mL using a pH gradient where each chromatogram was run using a different salt concentration.

Example 3—Chromatograms of an Ovalbumin Sample Using a Salt Gradient at Various pH Conditions on an Anion Exchange Column A liquid chromatography system similar to Example 1 was used in this Example except that an anion exchange chromatography column 118 (Thermo Scientific ProPac SAX-10 column), 10 micron particle size diameter, quaternary amine anion exchange groups, 4×250 mm—diameter× length) was installed into the system 100. Similar to Example 1, this Example used a salt gradient by linearly varying the salt concentration from 20 mM to 500 mM (88% A+2% B to 40% A+50% B over a 20 minute period. The sum of % A and % B was set to be equal to 90%. A salt gradient was run with various constant pH values that were 5.6, 6.5, 7.4, 8.4, 9.3, and 10.2, as shown in FIG. 6. The proportion of mobile phase A and mobile phase B was modified to obtain different salt concentrations while maintaining the sum of % C and % D to be equal to 10%. It should be noted that in this Example the % C and % D remain constant during the chromatography run. FIG. 6 shows a plurality of chromatograms separating a sample containing ovalbumin at a concentration of 5 mg/mL using a salt gradient where each chromatogram was run using a different pH value. The peak resolution generally improved at lower pH values.

Example 4—Chromatograms of a mAb Sample Using a Salt Gradient at Various pH Conditions on a Hydrophobic Interaction Column A liquid chromatography system similar to Example 1 was used in this Example. In contrast to the cation exchange chromatography column of Example 1, this Example used a hydrophobic interaction chromatography column (Thermo Scientific MAbPac HIC-Butyl column, 5 μm particle size diameter, 4.6 mm×100 mm). The gradient was configured with the parameters provided in Table 12 for the pH 5.6 condition. The parameters for mobile phase A and mobile phase B and time were the same and only the proportion of C and D changed for the other pH conditions.

TABLE 12

| Time | % A | % B | % C | % D |
| --- | --- | --- | --- | --- |
| −5.0 | 0 | 90 | 10 | 0 |
| 0.0 | 0 | 90 | 10 | 0 |
| 1.0 | 0 | 90 | 10 | 0 |
| 15.0 | 90 | 0 | 10 | 0 |
| 20.0 | 90 | 0 | 10 | 0 |

A monoclonal antibody sample (Rituximab biosimilar) was injected into the chromatographic system. The largest peak was assigned as the main peak. The preceding peaks in front of the main peak were assigned as hydrophilic variants. The succeeding peaks that elute later than the main peak were assigned as hydrophobic variants (FIG. 7). In this example, separation of hydrophilic and hydrophobic variants was affected by the pH condition used. An optimal separation pH condition can be selected using this method, which was pH 5.6.

While preferred embodiments of the present invention have been shown and described herein, it will be apparent to those skilled in the art that such embodiments are provided by way of example only. Numerous variations, changes, and substitutions will now occur to those skilled in the art without departing from the invention. While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well.

What is claimed is:

1. A method of determining buffer conditions for analyzing a biomolecule with a chromatography column using a salt gradient, the method comprising:
   A) performing a first, a second, and a third salt gradient chromatography runs using mobile phases having a first, a second, and a third constant pH values, respectively, to analyze the biomolecule, in which the mobile phases have the first, the second, and the third constant pH values were prepared with a first, a second, and a third predetermined proportions of a first eluent solution and a second eluent solution, respectively, wherein the first, the second, and the third predetermined proportions are different, in which the first, the second, and the third salt gradient chromatography runs each used a same salt gradient concentration range, a same gradient time, and a same salt gradient concentration change rate, in which
      a) the first eluent solution comprises at least four buffer salts where at least three of the four buffer salts are a monovalent buffer salt, have a net negative charge or a net neutral zwitterionic charge over a pH range of about 6 to about 10, and include a sulfonate group and an amine, where the first eluent solution has a first pH of about 6,
      b) the second eluent solution comprises at least four buffer salts where at least three of the four buffer salts are a monovalent buffer salt, have a net negative charge or a net neutral zwitterionic charge over a pH range of about 6 to about 10, and include a sulfonate group and an amine, where the second eluent solution has a second pH of about 10;

B) measuring one or more peaks during each of the first, the second, and the third salt gradient chromatography runs; and C) performing a chromatography optimization algorithm on the measured one or more peaks of the first, the second, and the third salt gradient chromatography runs to identify at least one optimized salt gradient chromatography run from the first, the second, and the third salt gradient chromatography runs, in which the performing of the chromatography optimization algorithm identifies at least one optimized salt gradient chromatography run from the first, the second, and the third salt gradient chromatography runs.

2. The method of claim 1, in which the chromatography optimization algorithm comprises:

a) a total number of peaks algorithm that comprises:
  $a_1$) counting a total number of the peaks measured for each of the first, the second, and the third salt gradient chromatography runs; and
  $a_2$) identifying at least one of the first, the second, and the third salt gradient chromatography runs as having a largest total number of peaks;

b) a peak-to-valley algorithm that comprises:
  b1) calculating a preceding peak-to-valley ratio for each of the first, the second, and the third salt gradient chromatography runs, the calculating of the preceding peak-to-valley ratios comprise:
    i) identifying a main peak having a main peak retention time for each of the first, the second, and the third salt gradient chromatography runs, in which the main peak has a main peak height corresponding to a highest absolute magnitude of a detected signal;
    ii) identifying a preceding peak having a preceding peak retention time and a preceding peak height, for each of the first, the second, and the third salt gradient chromatography runs, in which the preceding peak is adjacent to the main peak and the preceding peak retention time is less than the main peak retention time;
    iii) identifying a preceding valley having a preceding valley retention time and a preceding valley height, for each of the first, the second, and the third salt gradient chromatography runs, in which the preceding valley is in between the main peak and the preceding peak; and
    iv) dividing the main peak height by the preceding valley height to form the preceding peak-to-valley ratio for each of the first, the second, and the third salt gradient chromatography runs;
  b2) calculating a succeeding peak-to-valley ratio for each of the first, the second, and the third salt gradient chromatography runs, the calculating of the succeeding peak-to-valley ratios comprise:
    i) identifying a succeeding peak having a succeeding peak retention time and a succeeding peak height for each of the first, the second, and the third salt gradient chromatography runs, in which the succeeding peak is adjacent to the main peak and the succeeding peak retention time is greater than the main peak retention time; and
    ii) identifying a succeeding valley having a succeeding valley retention time and a succeeding valley height, for each of the first, the second, and the third salt gradient chromatography runs, in which the succeeding valley is in between the main peak and the succeeding peak;
    iii) dividing the main peak height by the succeeding valley height to form the succeeding peak-to-valley ratio for each of the first, the second, and the third salt gradient chromatography runs;
  b3) multiplying the preceding peak-to-valley ratio for each of the first, the second, and the third salt gradient chromatography runs by the succeeding peak-to-valley ratio for each of the first, the second, and the third salt gradient chromatography runs, respectively, to form a product for each of the first, the second, and the third salt gradient chromatography runs;
  b4) calculating a square root of the product for each of the first, the second, and the third salt gradient chromatography runs to form a composite peak-to-valley ratio for each of the first, the second, and the third salt gradient chromatography runs; and
  b5) identifying at least one of the first, the second, and the third salt gradient chromatography runs as having a largest composite peak-to-valley ratio; and c) a peak capacity algorithm that comprises:
  c1) calculating a peak capacity for each of the first, the second, and the third salt gradient chromatography runs based on an equation, the equation comprising:

$$n' = 1 + \frac{t_g}{PWHH_M \times 1.7}$$

where n' is the peak capacity, $t_g$ is a gradient time, $PWHH_M$ is a peak width at half height for the main peak; and
  c2) identifying at least one of the first, the second, and the third salt gradient chromatography runs as having a largest peak capacity, in which the performing of the chromatography optimization algorithm identifies at least one optimized salt gradient chromatography run from the first, the second, and the third salt gradient chromatography runs based on a) the total number of peaks algorithm, b) the peak-to-valley algorithm, and c) the peak capacity algorithm.

3. The method of claim 2 further comprising:

D) outputting on a display screen at least one optimized pH value corresponding to the at least one salt gradient chromatography run from the first, the second, and the third salt gradient chromatography runs having the largest total number of peaks in a first zone of the display screen;

E) outputting on the display screen at least one optimized pH value corresponding to the at least one salt gradient chromatography run from the first, the second, and the third salt gradient chromatography runs having the largest composite peak-to-valley ratio in a second zone of the display screen; and F) outputting on the display screen at least one optimized pH value corresponding to the at least one salt gradient chromatography run from the first, the second, and the third salt gradient chromatography runs having the largest peak capacity in a third zone of the display screen.

4. The method of claim 2 further comprising:

D) determining an optimized constant pH value based on the at least one optimized salt gradient chromatography run from the first, the second, and the third salt gradient chromatography runs;

E) performing a first, a second, and a third refining salt gradient chromatography runs using mobile phases all having the optimized constant pH value to analyze the biomolecule, in which the mobile phases were prepared with a same proportion of the first eluent solution and the second eluent solution, in which the first, the second, and the third refining salt gradient chromatography runs used a first, a second, and a third salt concentration change rates, respectively, and a same gradient time, wherein the first, the second, and the third salt concentration change rates are different, in which the mobile phases having the first, the second, and the third salt concentration change rates were prepared with varying proportions of a water and a salt solution;

F) measuring one or more peaks during each of the first, the second, and the third refining salt gradient chromatography runs; and G) performing a refining chromatography optimization algorithm on the measured one or more peaks of the first, the second, and the third refining salt gradient chromatography runs to identify at least one optimized refining salt gradient chromatography run from the first, the second, and the third refining salt gradient chromatography runs, in which the performing of the chromatography optimization algorithm identifies at least one optimized refining salt gradient chromatography run from the first, the second, and the third refining salt gradient chromatography runs.

5. The method of claim 4, in which the refining chromatography optimization algorithm comprises:

a) a refining total number of peaks algorithm that comprises:
  $a_1$) counting a total number of the peaks measured for each of the first, the second, and the third refining salt gradient chromatography runs; and
  $a_2$) identifying at least one of the first, the second, and the third refining salt gradient chromatography runs as having a largest total number of peaks;

b) a refining peak-to-valley algorithm that comprises:
  b1) calculating a preceding peak-to-valley ratio for each of the first, the second, and the third refining salt gradient chromatography runs, the calculating of the preceding peak-to-valley ratios comprise:
    i) identifying a main peak having a main peak retention time for each of the first, the second, and the third refining salt gradient chromatography runs, in which the main peak has a main peak height corresponding to a highest absolute magnitude of a detected signal;
    ii) identifying a preceding peak having a preceding peak retention time and a preceding peak height, for each of the first, the second, and the third refining salt gradient chromatography runs, in which the preceding peak is adjacent to the main peak and the preceding peak retention time is less than the main peak retention time;
    iii) identifying a preceding valley having a preceding valley retention time and a preceding valley height, for each of the first, the second, and the third refining salt gradient chromatography runs, in which the preceding valley is in between the main peak and the preceding peak; and
    iv) dividing the main peak height by the preceding valley height to form the preceding peak-to-valley ratio for each of the first, the second, and the third refining salt gradient chromatography runs;
  b2) calculating a succeeding peak-to-valley ratio for each of the first, the second, and the third refining salt gradient chromatography runs, the calculating of the succeeding peak-to-valley ratios comprise:
    i) identifying a succeeding peak having a succeeding peak retention time and a succeeding peak height for each of the first, the second, and the third refining salt gradient chromatography runs, in which the succeeding peak is adjacent to the main peak and the succeeding peak retention time is greater than the main peak retention time; and
    ii) identifying a succeeding valley having a succeeding valley retention time and a succeeding valley height, for each of the first, the second, and the third refining salt gradient chromatography runs, in which the succeeding valley is in between the main peak and the succeeding peak;
    iii) dividing the main peak height by the succeeding valley height to form the succeeding peak-to-valley ratio for each of the first, the second, and the third refining salt gradient chromatography runs;
  b3) multiplying the preceding peak-to-valley ratio for each of the first, the second, and the third refining salt gradient chromatography runs by the succeeding peak-to-valley ratio for each of the first, the second, and the third refining salt gradient chromatography runs, respectively, to form a product for each of the first, the second, and the third refining salt gradient chromatography runs;
  b4) calculating a square root of the product for each of the first, the second, and the third refining salt gradient chromatography runs to form a composite peak-to-valley ratio for each of the first, the second, and the third refining salt gradient chromatography runs; and
  b5) identifying at least one of the first, the second, and the third refining salt gradient chromatography runs as having a largest composite peak-to-valley ratio; and c) a refining peak capacity algorithm that comprises:
  c1) calculating a peak capacity for each of the first, the second, and the third refining salt gradient chromatography runs based on an equation, the equation comprising:

$$n' = 1 + \frac{t_g}{PWHH_M \times 1.7}$$

where n' is the peak capacity, $t_g$ is a gradient time, $PWHH_M$ is a peak width at half height for the main peak; and
  c2) identifying at least one of the first, the second, and the third refining salt gradient chromatography runs as having a largest peak capacity, in which the performing of the chromatography optimization algorithm identifies at least one optimized refining salt gradient chromatography run from the first, the second, and the third refining salt gradient chromatography runs based on a) the refining total number of peaks algorithm, b) the refining peak-to-valley algorithm, and c) the refining peak capacity algorithm.

6. The method of claim 5 further comprising:
H) outputting on a display screen at least one optimized pH value corresponding to the at least one refining salt gradient chromatography run from the first, the second, and the third refining salt gradient chromatography runs having the largest total number of peaks in a first zone of the display screen;
E) outputting on the display screen at least one optimized pH value corresponding to the at least one refining salt gradient chromatography run from the first, the second, and the third refining salt gradient chromatography runs having the composite largest composite peak-to-valley ratio in a second zone of the display screen; and
F) outputting on the display screen at least one optimized pH value corresponding to the at least one refining salt gradient chromatography run from the first, the second, and the third refining salt gradient chromatography runs having the largest peak capacity in a third zone of the display screen.

7. The method of claim 1, in which the first eluent solution and the second eluent solution both have a total buffer salt concentration of greater than about 25 millimolar.

8. The method of claim 1, in which the first eluent solution and the second eluent solution both have a total buffer salt concentration of greater than about 250 millimolar.

9. A method of determining buffer conditions for analyzing a biomolecule with a chromatography column using a pH gradient, the method comprising:
A) performing a first, a second, and a third pH gradient chromatography runs using mobile phases having a first, a second, and a third constant salt concentrations, respectively, to analyze the biomolecule, in which the mobile phases have the first, the second, and the third constant salt concentrations were prepared with a first, a second, and a third predetermined proportions of a water and a salt solution, respectively, wherein the first, the second, and the third predetermined proportions are different, in which the first, the second, and the third pH gradient chromatography runs each used a same pH gradient concentration range, a same gradient time, and a same pH gradient concentration change rate, in which the mobile phases for the first, the second, and the third pH gradient chromatography runs are prepared with
a) the first eluent solution comprises at least four buffer salts where at least three of the four buffer salts are a monovalent buffer salt, have a net negative charge or a net neutral zwitterionic charge over a pH range of about 6 to about 10, and include a sulfonate group and an amine, where the first eluent solution has a first pH of about 6,
b) the second eluent solution comprises at least four buffer salts where at least three of the four buffer salts are a monovalent buffer salt, have a net negative charge or a net neutral zwitterionic charge over a pH range of about 6 to about 10, and include a sulfonate group and an amine, where the second eluent solution has a second pH of about 10;
B) measuring one or more peaks during each of the first, the second, and the third pH gradient chromatography runs; and
C) performing a chromatography optimization algorithm on the measured one or more peaks of the first, the second, and the third pH gradient chromatography runs to identify at least one optimized pH gradient chromatography run from the first, the second, and the third pH gradient chromatography runs,
in which the performing of the chromatography optimization algorithm identifies at least one optimized pH gradient chromatography run from the first, the second, and the third pH gradient chromatography runs.

10. The method of claim 9, in which the chromatography optimization algorithm comprises:
a) a total number of peaks algorithm that comprises:
$a_1$) counting a total number of the peaks measured for each of the first, the second, and the third pH gradient chromatography runs; and
$a_2$) identifying at least one of the first, the second, and the third pH gradient chromatography runs as having a largest total number of peaks;
b) a peak-to-valley algorithm that comprises:
b1) calculating a preceding peak-to-valley ratio for each of the first, the second, and the third pH gradient chromatography runs, the calculating of the preceding peak-to-valley ratios comprise:
i) identifying a main peak having a main peak retention time for each of the first, the second, and the third pH gradient chromatography runs, in which the main peak has a main peak height corresponding to a highest absolute magnitude of a detected signal;
ii) identifying a preceding peak having a preceding peak retention time and preceding peak height, for each of the first, the second, and the third pH gradient chromatography runs, in which the preceding peak is adjacent to the main peak and the preceding peak retention time is less than the main peak retention time;
iii) identifying a preceding valley having a preceding valley retention time and preceding valley height, for each of the first, the second, and the third pH gradient chromatography runs, in which the preceding valley is in between the main peak and the preceding peak; and
iv) dividing the main peak height by the preceding valley height to form the preceding peak-to-valley ratio for each of the first, the second, and the third pH gradient chromatography runs;
b2) calculating a succeeding peak-to-valley ratio for each of the first, the second, and the third pH gradient chromatography runs, the calculating of the succeeding peak-to-valley ratios comprise:
i) identifying a succeeding peak having a succeeding peak retention time and a succeeding peak height for each of the first, the second, and the third pH gradient chromatography runs, in which the succeeding peak is adjacent to the main peak and the succeeding peak retention time is greater than the main peak retention time; and
ii) identifying a succeeding valley having a succeeding valley retention time and succeeding valley height, for each of the first, the second, and the third pH gradient chromatography runs, in which the succeeding valley is in between the main peak and the succeeding peak;
iii) dividing the main peak height by the succeeding valley height to form the succeeding peak-to-valley ratio for each of the first, the second, and the third pH gradient chromatography runs;
b3) multiplying the preceding peak-to-valley ratio for each of the first, the second, and the third pH gradient chromatography runs by the succeeding peak-tovalley ratio for each of the first, the second, and the third pH gradient chromatography runs, respectively, to form a product for each of the first, the second, and the third pH gradient chromatography runs;

b4) calculating a square root of the product for each of the first, the second, and the third pH gradient chromatography runs to form a composite peak-to-valley ratio for each of the first, the second, and the third pH gradient chromatography runs; and b5) identifying at least one of the first, the second, and the third pH gradient chromatography runs as having a largest composite peak-to-valley ratio; and c) a peak capacity algorithm that comprises:

c1) calculating a peak capacity for each of the first, the second, and the third pH gradient chromatography runs based on an equation, the equation comprising:

$$n' = 1 + \frac{t_g}{PWHH_M \times 1.7}$$

where n' is the peak capacity, $t_g$ is a gradient time, $PWHH_M$ is a peak width at half height for the main peak; and c2) identifying at least one of the first, the second, and the third pH gradient chromatography runs as having a largest peak capacity, in which the performing of the chromatography optimization algorithm identifies at least one optimized pH gradient chromatography run from the first, the second, and the third pH gradient chromatography runs based on a) the total number of peaks algorithm, b) the peak-to-valley algorithm, and c) the peak capacity algorithm.

11. The method of claim 10 further comprising:

D) outputting on a display screen at least one optimized salt concentration corresponding to the at least one pH gradient chromatography run from the first, the second, and the third pH gradient chromatography runs having the largest total number of peaks in a first zone of the display screen;

E) outputting on the display screen at least one optimized salt concentration corresponding to the at least one pH gradient chromatography run from the first, the second, and the third pH gradient chromatography runs having the largest composite peak-to-valley ratio in a second zone of the display screen; and F) outputting on the display screen at least one optimized salt concentration corresponding to the at least one pH gradient chromatography run from the first, the second, and the third pH gradient chromatography runs having the largest peak capacity in a third zone of the display screen.

12. The method of claim 10 further comprising:

D) determining an optimized constant salt concentration based on the at least one optimized pH gradient chromatography run from the first, the second, and the third pH gradient chromatography runs;

E) performing a first, a second, and a third refining pH gradient chromatography runs using mobile phases all having the optimized constant salt concentration to analyze the biomolecule, in which the mobile phases were prepared with a same proportion of the water and the salt solution, in which the first, the second, and the third refining pH gradient chromatography runs used a first, a second, and a third pH change rates, respectively, and a same gradient time, wherein the first, the second, and the third pH change rates are different, in which the mobile phases having the first, the second, and the third pH change rates were prepared with varying proportions of the first eluent solution and the second eluent solution;

F) measuring one or more peaks during each of the first, the second, and the third refining pH gradient chromatography runs; and G) performing a refining chromatography optimization algorithm on the measured one or more peaks of the first, the second, and the third refining pH gradient chromatography runs to identify at least one optimized refining pH gradient chromatography run from the first, the second, and the third refining pH gradient chromatography runs, in which the performing of the chromatography optimization algorithm identifies at least one optimized refining pH gradient chromatography run from the first, the second, and the third refining pH gradient chromatography runs.

13. The method of claim 12, in which the refining chromatography optimization algorithm comprises:

a) a refining total number of peaks algorithm that comprises:

$a_1$) counting a total number of the peaks measured for each of the first, the second, and the third refining pH gradient chromatography runs; and $a_2$) identifying at least one of the first, the second, and the third refining pH gradient chromatography runs as having a largest total number of peaks;

b) a refining peak-to-valley algorithm that comprises:

b1) calculating a preceding peak-to-valley ratio for each of the first, the second, and the third refining pH gradient chromatography runs, the calculating of the preceding peak-to-valley ratios comprise:

i) identifying a main peak having a main peak retention time for each of the first, the second, and the third refining pH gradient chromatography runs, in which the main peak has a main peak height corresponding to a highest absolute magnitude of a detected signal;

ii) identifying a preceding peak having a preceding peak retention time and preceding peak height, for each of the first, the second, and the third refining pH gradient chromatography runs, in which the preceding peak is adjacent to the main peak and the preceding peak retention time is less than the main peak retention time;

iii) identifying a preceding valley having a preceding valley retention time and preceding valley height, for each of the first, the second, and the third refining pH gradient chromatography runs, in which the preceding valley is in between the main peak and the preceding peak; and iv) dividing the main peak height by the preceding valley height to form the preceding peak-to-valley ratio for each of the first, the second, and the third refining pH gradient chromatography runs;

b2) calculating a succeeding peak-to-valley ratio for each of the first, the second, and the third refining pH gradient chromatography runs, the calculating of the succeeding peak-to-valley ratios comprise:

i) identifying a succeeding peak having a succeeding peak retention time and a succeeding peak height for each of the first, the second, and the third refining pH gradient chromatography runs, in which the succeeding peak is adjacent to the main peak and the succeeding peak retention time is greater than the main peak retention time; and ii) identifying a succeeding valley having a succeeding valley retention time and a succeeding valley height, for each of the first, the second, and the third refining pH gradient chromatography runs, in which the succeeding valley is in between the main peak and the succeeding peak;

iii) dividing the main peak height by the succeeding valley height to form the succeeding peak-to-valley ratio for each of the first, the second, and the third refining pH gradient chromatography runs;

b3) multiplying the preceding peak-to-valley ratio for each of the first, the second, and the third refining pH gradient chromatography runs by the succeeding peak-to-valley ratio for each of the first, the second, and the third refining pH gradient chromatography runs, respectively, to form a product for each of the first, the second, and the third refining pH gradient chromatography runs;

b4) calculating a square root of the product for each of the first, the second, and the third refining pH gradient chromatography runs to form a composite peak-to-valley ratio for each of the first, the second, and the third refining pH gradient chromatography runs; and b5) identifying at least one of the first, the second, and the third refining pH gradient chromatography runs as having a largest composite peak-to-valley ratio; and c) a refining peak capacity algorithm that comprises:

c1) calculating a peak capacity for each of the first, the second, and the third refining pH gradient chromatography runs based on an equation, the equation comprising:

$$n' = 1 + \frac{t_g}{PWHH_M \times 1.7}$$

where $n'$ is the peak capacity, $t_g$ is a gradient time, $PWHH_M$ is a peak width at half height for the main peak; and c2) identifying at least one of the first, the second, and the third refining pH gradient chromatography runs as having a largest peak capacity, in which the performing of the chromatography optimization algorithm identifies at least one optimized refining pH gradient chromatography run from the first, the second, and the third refining pH gradient chromatography runs based on a) the refining total number of peaks algorithm, b) the refining peak-to-valley algorithm, and c) the refining peak capacity algorithm.

14. The method of claim 13 further comprising:

H) outputting on a display screen at least one optimized salt concentration corresponding to the at least one refining pH gradient chromatography run from the first, the second, and the third refining pH gradient chromatography runs having the largest total number of peaks in a first zone of the display screen;

E) outputting on the display screen at least one optimized salt concentration corresponding to the at least one refining pH gradient chromatography run from the first, the second, and the third refining pH gradient chromatography runs having the largest composite peak-to-valley ratio in a second zone of the display screen; and F) outputting on the display screen at least one optimized salt concentration corresponding to the at least one refining pH gradient chromatography run from the first, the second, and the third refining pH gradient chromatography runs having the largest peak capacity in a third zone of the display screen.

15. The method of claim 9, in which the first eluent solution and the second eluent solution both have a total buffer salt concentration of greater than about 25 millimolar.

16. The method of claim 9, in which the first eluent solution and the second eluent solution both have a total buffer salt concentration of greater than about 250 millimolar.

* * * * *

UNITED STATES PATENT AND TRADEMARK OFFICE
CERTIFICATE OF CORRECTION

PATENT NO. : 11,022,585 B2
APPLICATION NO. : 16/435537
DATED : June 1, 2021
INVENTOR(S) : Shanhua Lin Liehr et al.

Page 1 of 1

It is certified that error appears in the above-identified patent and that said Letters Patent is hereby corrected as shown below:

In the Claims

Claim 10, Column 34, Line 25: replace "and" with -- and a --, therefor.

Claim 10, Column 34, Line 28: replace "and" with -- and a --, therefor.

Claim 10, Column 34, Line 56: replace "and" with -- and a --, therefor.

Claim 10, Column 36, Line 43: replace "and" with -- and a --, therefor.

Claim 10, Column 36, Line 50: replace "and" with -- and a --, therefor.

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*